(12) United States Patent
Takeyoshi et al.

(10) Patent No.: US 7,657,653 B2
(45) Date of Patent: Feb. 2, 2010

(54) LOAD DECENTRALIZATION METHOD AND APPARATUS THEREOF

(75) Inventors: Haruyuki Takeyoshi, Kawasaki (JP); Hideaki Ono, Yamaguchi (JP); Ryuichi Takechi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 701 days.

(21) Appl. No.: 11/043,452

(22) Filed: Jan. 26, 2005

(65) Prior Publication Data

US 2005/0207394 A1  Sep. 22, 2005

Related U.S. Application Data

(63) Continuation of application No. PCT/JP02/13199, filed on Dec. 17, 2002.

(51) Int. Cl.
    *G06F 15/173* (2006.01)
(52) U.S. Cl. ...................................................... 709/242
(58) Field of Classification Search ................ 709/238, 709/243, 242; 370/351, 328, 329, 331, 230
    See application file for complete search history.

(56) References Cited

U.S. PATENT DOCUMENTS

| | | | |
|---|---|---|---|
| 6,366,561 B1 * | 4/2002 | Bender | 370/238 |
| 6,973,057 B1 * | 12/2005 | Forslow | 370/328 |
| 2003/0212616 A1 * | 11/2003 | Castrogiovanni et al. | 705/30 |
| 2004/0052238 A1 * | 3/2004 | Borella et al. | 370/349 |
| 2004/0081086 A1 * | 4/2004 | Hippelainen et al. | 370/227 |
| 2004/0117508 A1 * | 6/2004 | Shimizu | 709/249 |
| 2004/0137888 A1 * | 7/2004 | Ohki | 455/417 |
| 2004/0246933 A1 * | 12/2004 | Valko et al. | 370/338 |

FOREIGN PATENT DOCUMENTS

| | | |
|---|---|---|
| JP | 7-295843 | 11/1995 |
| JP | 7-319835 | 12/1995 |
| JP | 2000-207370 | 7/2000 |
| JP | 2002-190770 | 7/2002 |
| JP | 2002-305532 | 10/2002 |
| JP | 2003-018192 | 1/2003 |

OTHER PUBLICATIONS

International Search Report dated Feb. 25, 2003.

(Continued)

*Primary Examiner*—Andrew Caldwell
*Assistant Examiner*—Jason Recek
(74) *Attorney, Agent, or Firm*—Fujitsu Patent Center

(57) ABSTRACT

The present invention discloses a load decentralization method for decentralizing load centralized to a MAP of a hierarchical domain in a network where packets destined to mobile nodes in the network are transmitted to the mobile nodes via the MAP, in which the MAP includes a table part for managing a corresponding relation of home addresses and Care-of-Addresses of the mobile nodes in the hierarchical domain. The method includes the steps of providing a same function as the MAP to at least a portion of routers situated in the hierarchical domain of the MAP, moving one of the elements in the table part to the portion of the routers when a congestion of the MAP is detected, and actuating the portion of the routers to operate as a substitute of the MAP.

7 Claims, 27 Drawing Sheets

OTHER PUBLICATIONS

Ryuichi Takechi, et al. A Study on Mobile IP Based Network Architecture. Technical Report of IEICE, Oct. 27, 2000, pp. 7-12.

Haruyuki Takeyoshi, et al. Evaluation of the Hierarchical Mobile Ipv6 based Network incorporating Route Optimization Effect. Technical Report of IEICE, Feb. 21, 2002, pp. 29-34.

Hideaki Ono et al. Study of Optimization based on Hierarchical Mobile Ipv6 Technical Report of IEICE, Jul. 21, 2001, pp. 87-92.

* cited by examiner

LOAD DECENTRALIZATION METHOD AND APPARATUS THEREOF

CROSS-REFERENCE TO RELATED APPLICATIONS

This application is a U.S. continuation application filed under 35 USC 111(a) claiming benefit under 35 USC 120 and 365(c) of PCT application JP2002/13199, filed Dec. 17, 2002. The foregoing application is hereby incorporated herein by reference.

BACKGROUND OF THE INVENTION

1. Field of the Invention

The present invention relates to a load decentralization method and an apparatus thereof, and more particularly, a load decentralization method and an apparatus thereof for decentralizing load centralized to a mobility anchor point (MAP) in a network.

2. Description of the Related Art

In recent years and continuing, mobile IP is proposed for achieving transfer of packets to a location of a mobile node (MN) even in a case where the mobile node has moved in an IP (Internet Protocol) network, and thus enabling movement management of the mobile node within a carrier network regardless of the type of access system.

With mobile IP, the mobile node has a home address which does not change even when the mobile node moves, and a CoA (Care of Address) which changes in correspondence with the movement of the mobile node. By transferring the packets destined (addressed) to the home address of the mobile node, mobile communications in the IP level can be achieved.

Furthermore, a moving Internet user can be accommodated with continuous IP communication, regardless of the type of mobile node that the user is using, by registering the unchanging home address as an ID on the Internet. Particularly, in a case where the user uses a hierarchical mobile IPv6 (Internet Protocol version 6) as the ID, constant two-way IP communication can be attained.

A hierarchical mobile IPv6 technology is proposed as a method for reducing load of the entire mobile IP network by dividing a network into plural hierarchical domains and locally managing the local movement of the mobile node (See IETF Draft draft-ietf-mobileip-hmipv6-05.txt). In the hierarchical mobile Ipv6, a hierarchical node, being referred to as a MAP (Mobility Anchor Point), is disposed in each hierarchical domain.

In hierarchical mobile IPv6, packets to the mobile nodes are specified to pass through the MAP, in which the MAP processes a large load for decapsulating, capsulating, and forwarding all packets destined to the mobile nodes in the hierarchical network.

Furthermore, from the aspect of network management, the hierarchical mobile IPv6 is effective security-wise since the address in the hierarchical network can be hidden. However, during route optimization, the route of constantly passing through the MAP may not necessarily be the optimum route since the address sent to a CN (Correspondent Node) is an RCoA (Regional CoA).

FIG. 1 shows a configuration of a hierarchical mobile IPv6 network. In FIG. 1, mobile nodes denoted as numerals 11, 12, and 13 are CNs (Correspondent Nodes) from the view point of MNs (Mobile Nodes) 26, 27 and 28. The home agent (Home Agent) 15 stores a correspondence between a home address, being an effective address in the hierarchical domain of the mobile node that does not change by the movement of the mobile node within the hierarchical domain, and the RCoa, being an address that changes whenever the mobile node moves overstriding the hierarchies, thereby allowing packets addressed to the mobile node to be transferred to the present location of the mobile node.

The MAPs 17 and 19 each serve as a home agent within the hierarchical domain. Access routers 21, 22, 23, and 24 are gateways for allowing the mobile nodes 26, 27 and 28 to access to the hierarchical mobile IPv6.

Here, a network where the mobile nodes 26, 27 and 28 originally belong to is referred to as a home network (a network at which the home agent storing the home addresses of the mobile nodes 26, 27 and 28 is located). A network where the mobile nodes 26, 27 and 28 perform communication at a portion separated from the home network is referred to as a roaming network. A network interposed between the home network and the roaming network is referred to as a relay network. With the above-described configuration of the hierarchical mobile IPv6 network, the dividing of the network in hierarchical domains, that is, dividing into hierarchical domains of the home network and the roaming network is mainly to apply to the roaming network.

FIG. 2 shows a mobile node registration operation without route optimization in a hierarchical mobile IPv6. Here, the RCoA (Regional CoA) is a virtual IP address, being connected to a link of the MAP, addressed to the mobile node. The RCoA is an IP address that can be received by the MAP and is assigned to each mobile node by the MAP. Furthermore, a LCoA (on-link CoA or Local CoA) is an IP address presently used by the mobile node and is assigned to each mobile node by an access router. The LCoA is updated along with the movement of the mobile node.

In moving within the hierarchical domain, the mobile node 26 reports the LCoA to the MAP 17 during location registration. In moving from one hierarchical domain to another, the mobile node 26 reports the LCoA to the MAP 17 and reports the RCoA to the home agent 15.

FIG. 3 shows a mobile node registration operation with route optimization in a hierarchical mobile IPv6. In a case of obtaining an optimized transfer route for packets transferred from a correspondent node (CN) 11, the mobile node 26 reports the RCoA in manner similar to registering location to the home agent.

FIG. 4 shows packet transfer after the mobile node registration without route optimization in a hierarchical mobile IPv6. In a case where there is no route optimization, since the correspondent nodes 11, 12 and 13 respectively transmit packets to the mobile nodes 26, 27 and 28 to the home address of the mobile nodes 26, 27 and 28, the packets addressed to the mobile nodes 26, 27 and 28 are always transferred via the home agent 15.

FIG. 5 shows packet transfer after the mobile node registration with route optimization in a hierarchical mobile IPv6. In a case where there is route optimization, since the correspondent nodes 11, 12 and 13 respectively transmit packets to the mobile nodes 26, 27 and 28 to the RCoA of the mobile nodes 26, 27 and 28, the packets addressed to the mobile nodes 26, 27 and 28 are not transferred via the home agent 15, but are transferred directly via the MAP 17.

For example, Japanese Laid-Open Patent Application No. 2002-190770 shows a relay apparatus provided with a communication channel in connection with another relay apparatus in which the relay apparatus measures a call amount of a wireless communication apparatus connected thereto, generates a call amount exceed report for reporting exceeding of a total call amount when the call amount exceeds a predetermined value, and transmits the report to the other relay apparatus. The other relay apparatus assigns a portion of relay capacity for securing auxiliary calls for the exceeding call amount and reports this to the relay apparatus with the exceeding call amounts. The relay apparatus receiving the report reports to the mobile node to change connection to the other relay apparatus.

With the static arrangement of the MAP in the hierarchical mobile Ipv6, there is a possibility of being unable to handle dynamically changing internet traffic. Particularly, in a case where the size of a hierarchic domain is large or a case where re-transmission of lost data is frequently performed, there is a problem that a load is frequently concentrated to a particular MAP.

Furthermore, with reference to FIG. 6, in a case of communicating between mobile nodes 26, 26 of different hierarchical domains where one of or both MAPs 17, 19 is in a state of congestion, the MAP (in this example MAP 17), which has already once transmitted data, is required to re-transmit the data when a re-transmission timer is cut off, thereby resulting in further congestion of the MAP 17.

SUMMARY OF THE INVENTION

It is a general object of the present invention to provide a load decentralization method and apparatus thereof that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a load decentralization method and apparatus thereof particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a load decentralization method for decentralizing load centralized to a MAP of a hierarchical domain in a network where packets destined to mobile nodes in the network are transmitted to the mobile nodes via the MAP, the MAP including a table part for managing a corresponding relation of home addresses and Care-of-Addresses of the mobile nodes in the hierarchical domain, the method including the steps of: providing a same function as the MAP to at least a portion of routers situated in the hierarchical domain of the MAP; moving one of the elements in the table part to the portion of the routers when a congestion of the MAP is detected; and actuating the portion of the routers to operate as a substitute of the MAP.

With this load decentralization method, load can be decentralized by activating the router (MAP function router) as the MAP in a case where the MAP is congested.

Other objects and further features of the present invention will be apparent from the following detailed description when read in conjunction with the accompanying drawings.

DESCRIPTION OF THE PREFERRED EMBODIMENTS

Embodiments of the present invention are described below with reference to the drawings.

In the present invention, all or at least a portion of routers in an hierarchical domain of a MAP (Mobility Anchor Point), except for the MAP itself, are provided with a same function as the MAP (MAP function) beforehand to allow other routers in the hierarchical network to be activated as a MAP, thereby decentralizing load in the hierarchical network.

Figure 1:
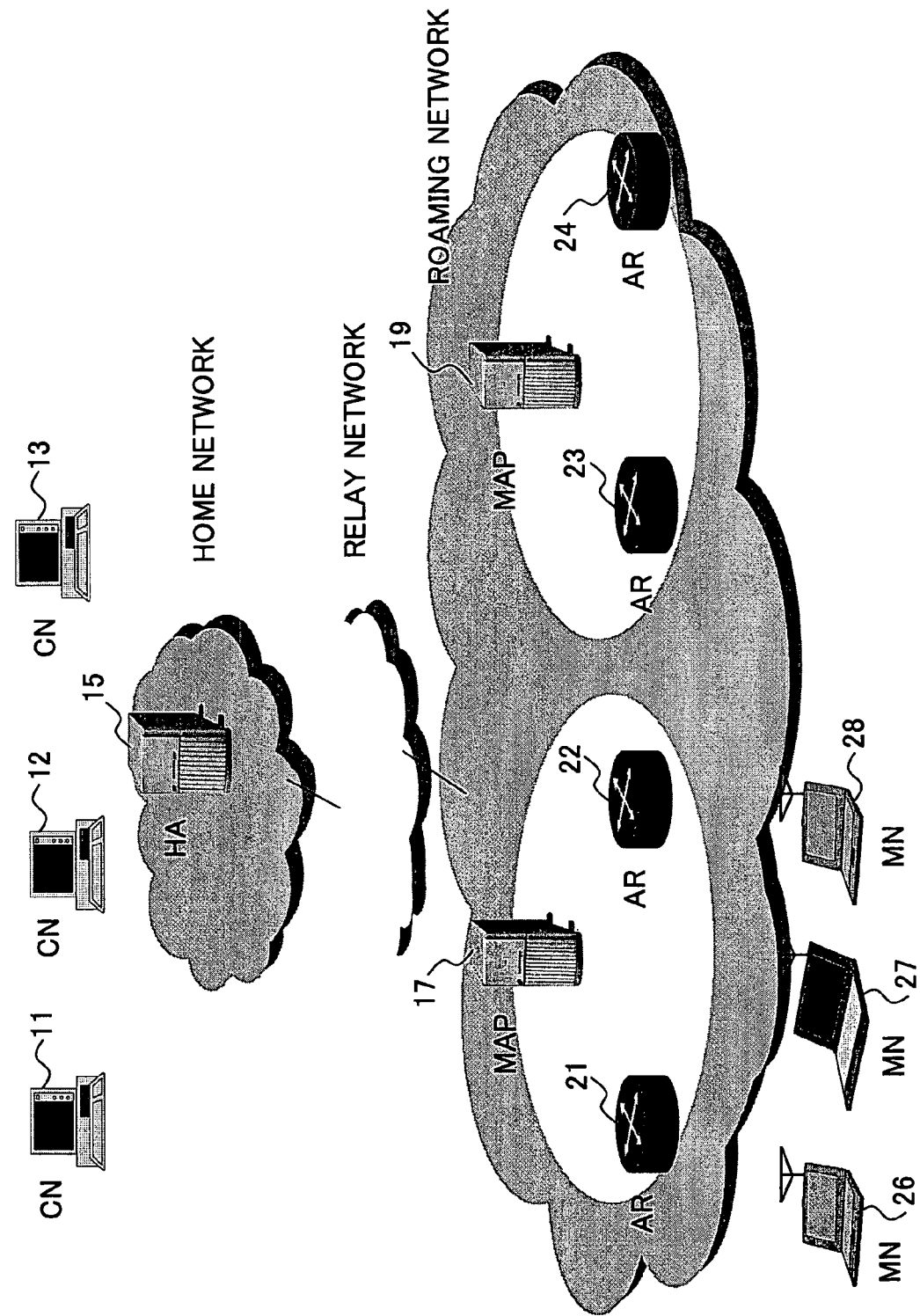
FIG. 1 is a drawing showing a configuration of a network in a hierarchical mobile IPv6.
Figure 2:
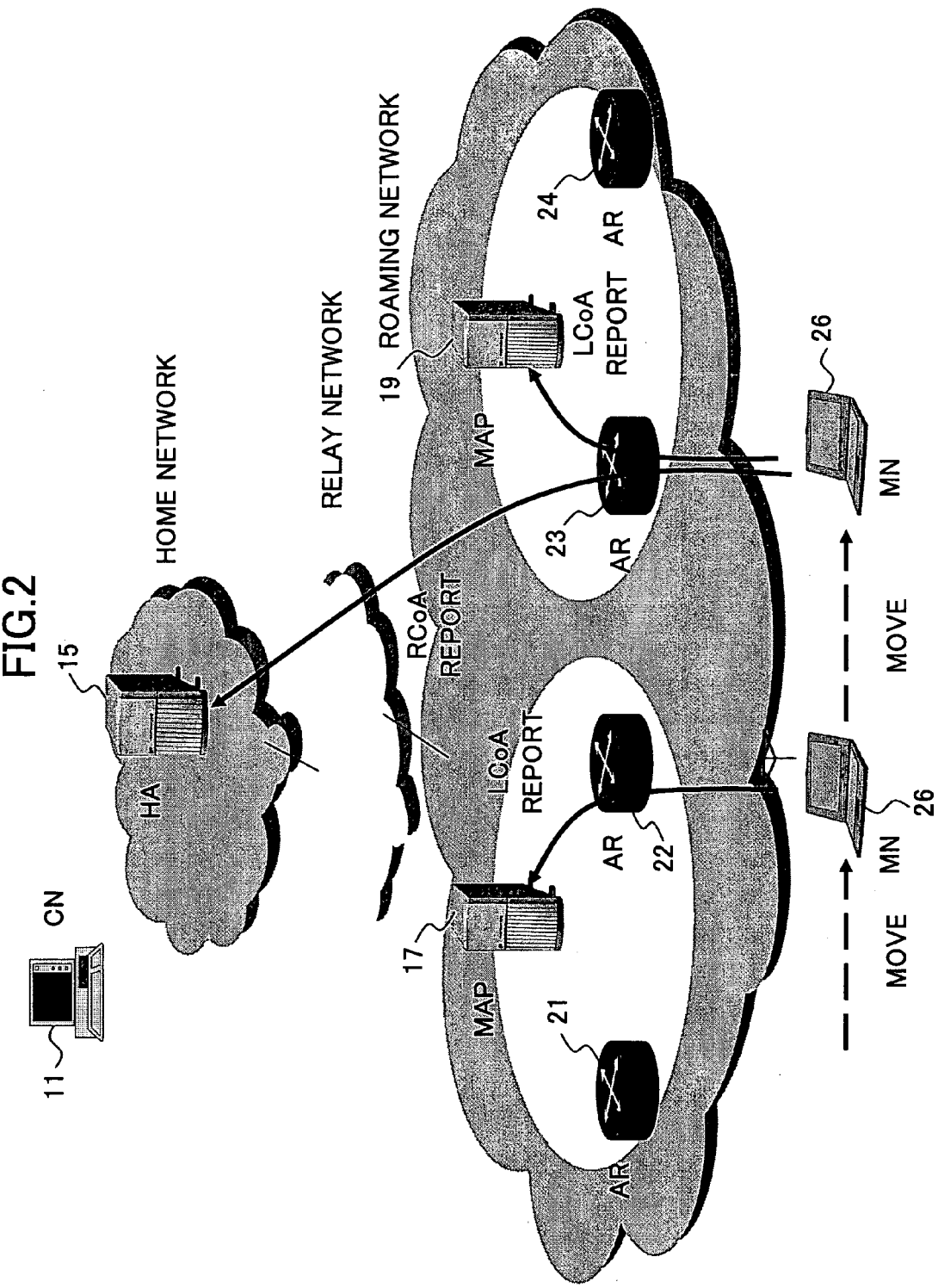
FIG. 2 is a drawing showing a location registration operation of a mobile node without route optimization in a hierarchical mobile IPv6.
Figure 3:
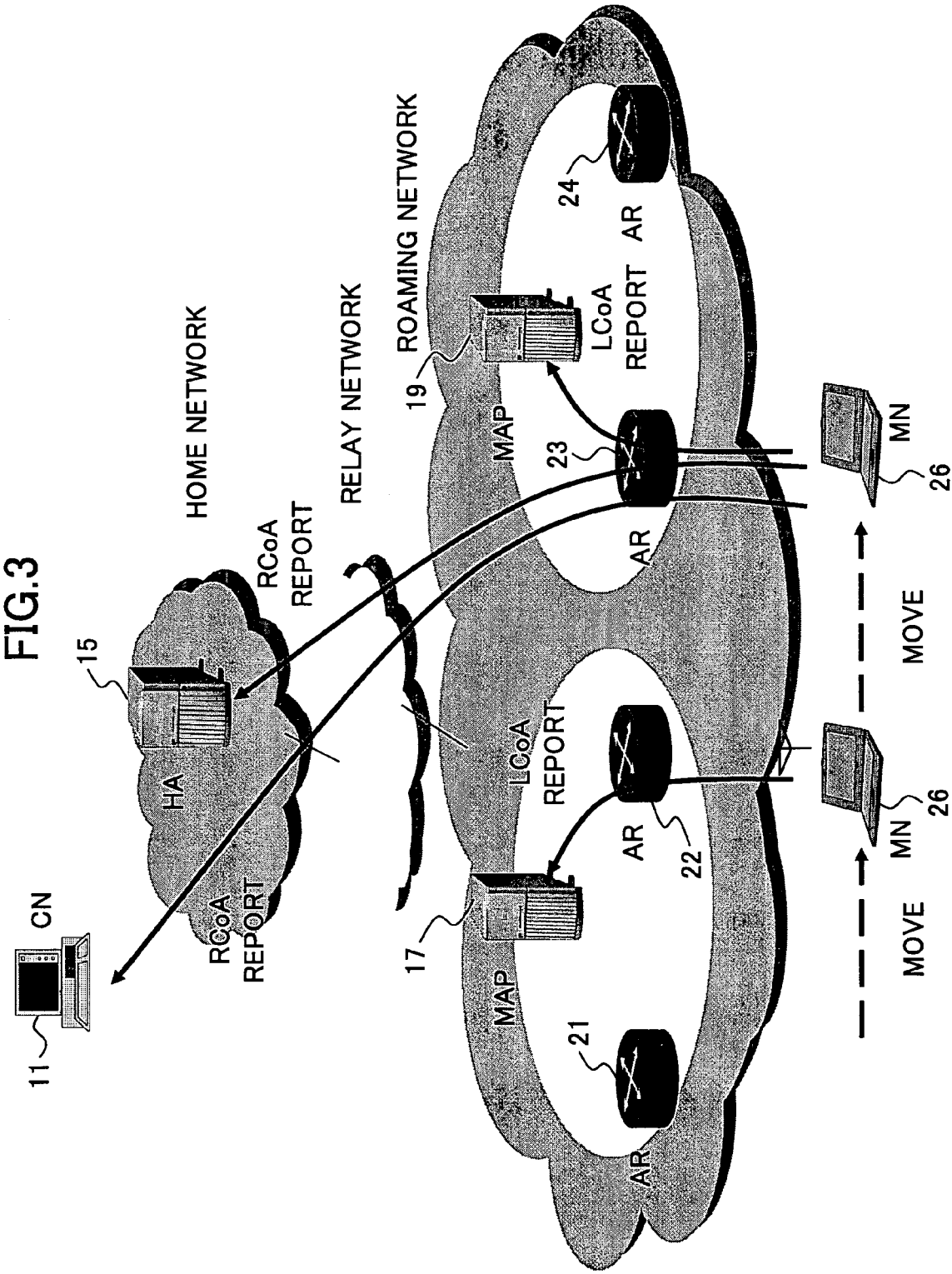
FIG. 3 is a drawing showing a location registration operation of a mobile node with route optimization in a hierarchical mobile IPv6.
Figure 4:
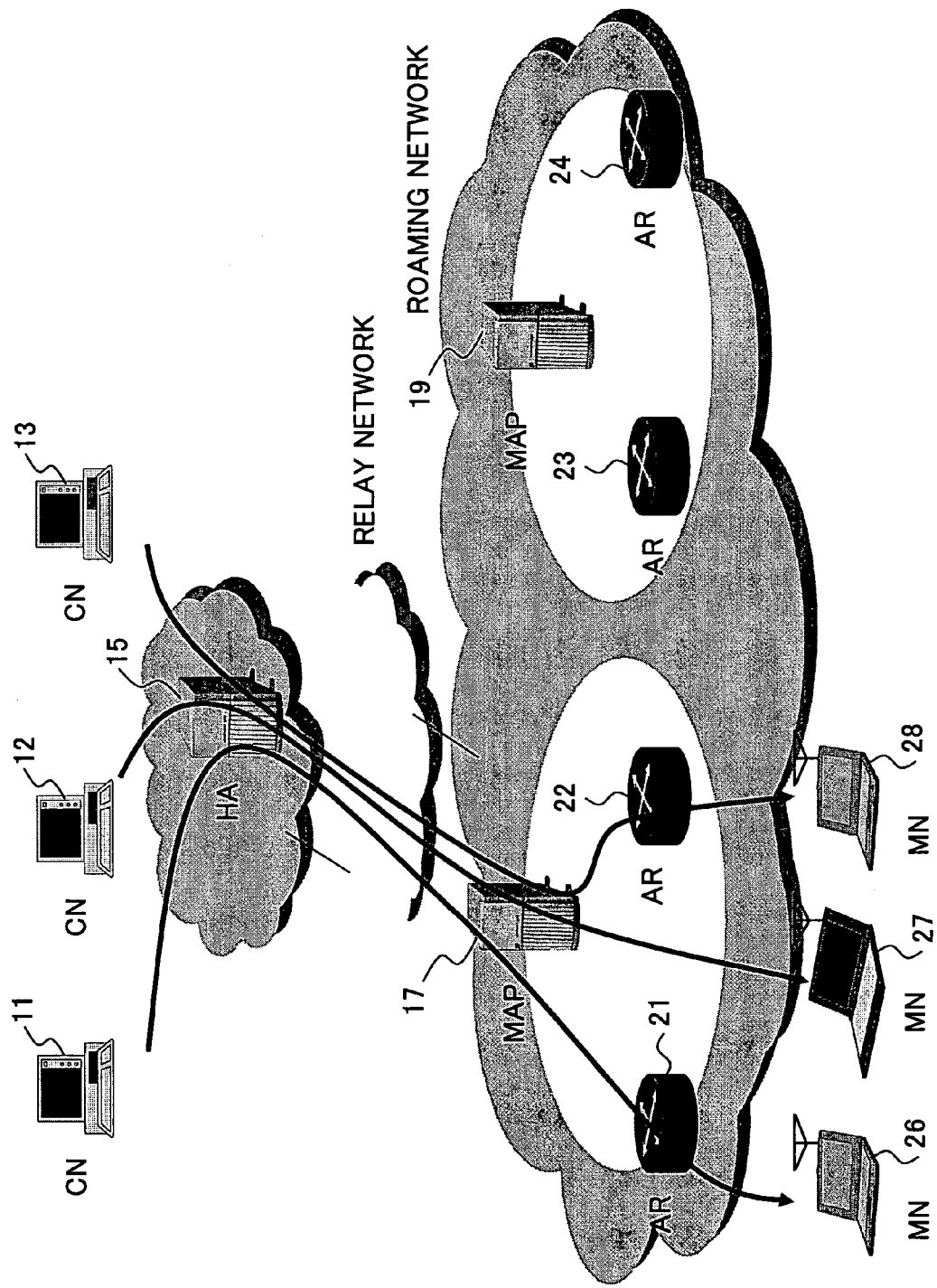
FIG. 4 is a drawing showing packet transfer after a location registration operation without route optimization in a hierarchical mobile IPv6.
Figure 5:
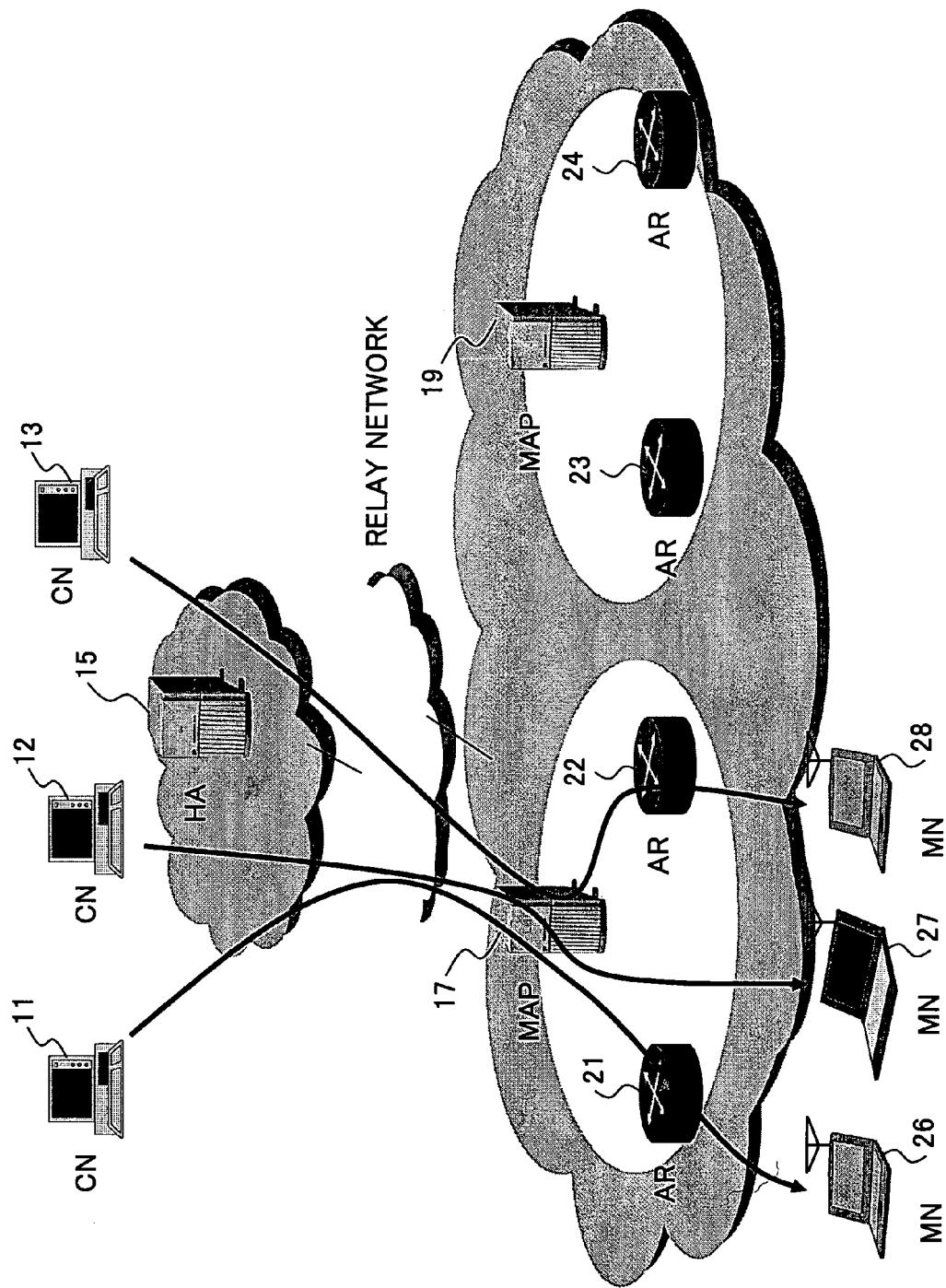
FIG. 5 is a drawing showing packet transfer after a location registration operation with route optimization in a Hierarchical Mobile IPv6.
Figure 6:
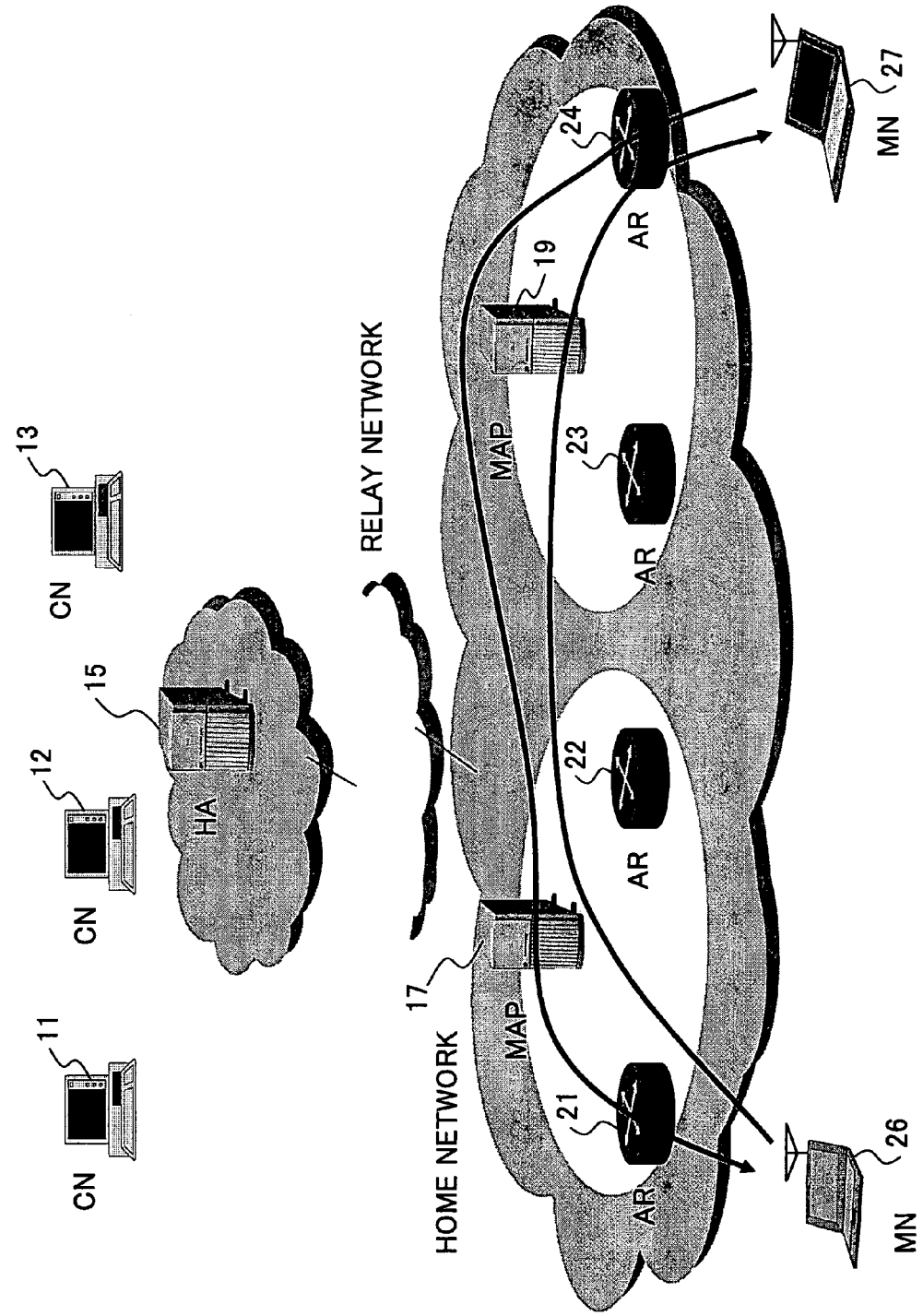
FIG. 6 is a drawing showing communication between mobile nodes belonging to separate hierarchic domains.
Figure 7:
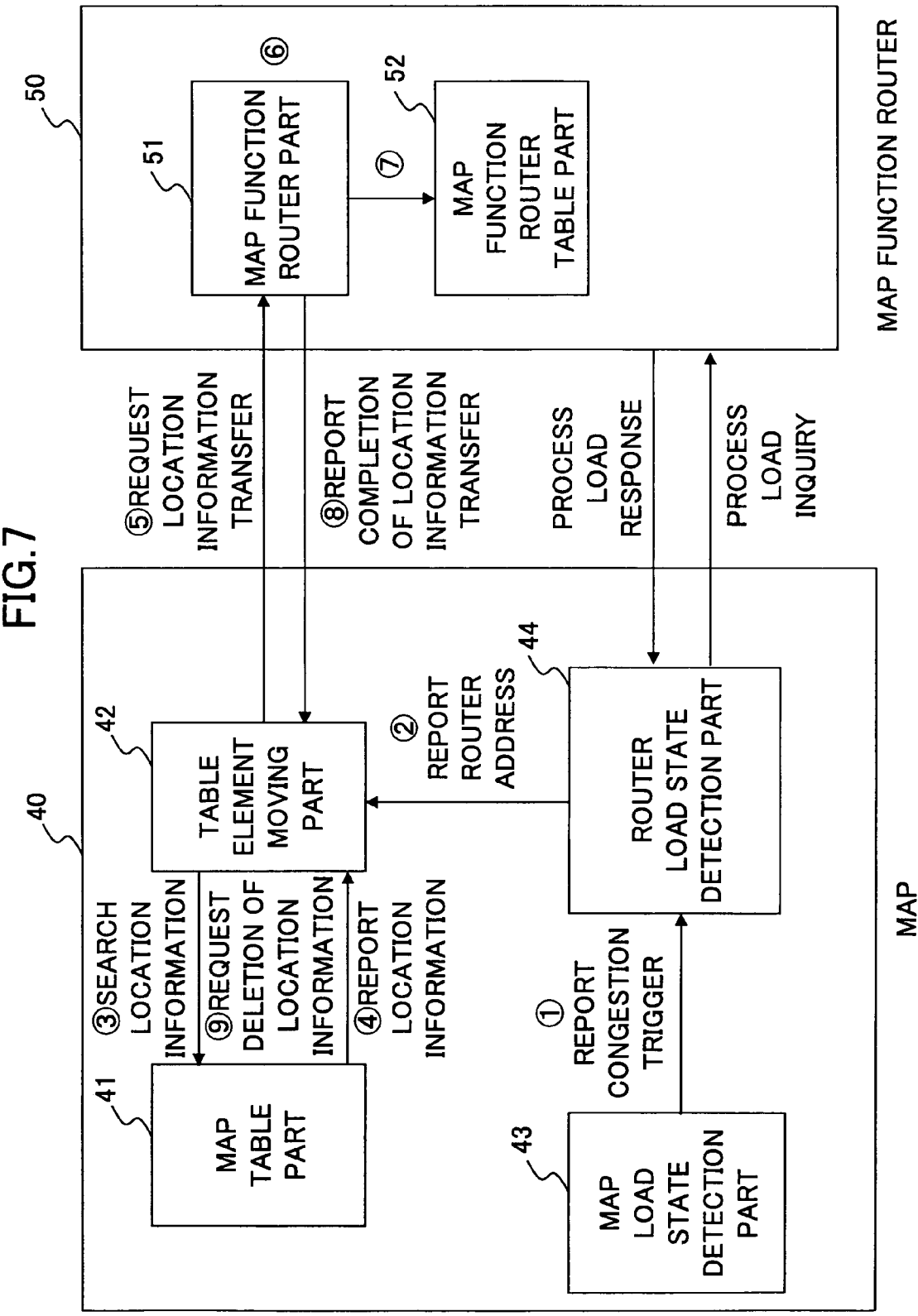
FIG. 7 is a drawing showing a configuration of a mechanism of a first embodiment of the present invention.

FIG. 7 is a diagram showing a structural configuration of a first embodiment of a method of the present invention. In FIG. 7, a MAP 40 includes a MAP table part 41 for storing a corresponding relation between an effective address of a mobile node in the hierarchical domain that does not change regardless of the moving of the mobile node (home address) and a CoA (Care of Address) that changes by the moving of the mobile node, and a table element moving part 42, a MAP load state detection part 43, and a router load state detection part 44. It is to be noted that a MAP function router is a router that is provided with a function same as the MAP beforehand.

Next, the numbers represented with circles in FIG. 7 are described in correspondence with the following numbers represented with brackets.

(1) The MAP 40 reports a congestion trigger to the router load state detection part 44 when the MAP load state detection part 43 detects congestion of the MAP 40.

The router load state detection part 44 detects, in a given constant cycle, a process load state of the MAP function router 50 situated in a same hierarchical domain of the MAP 40.

(2) The router load state detection part 44 reports an address of the MAP function router (in this example, MAP function router 50) having the least process load to the table element moving part 42.

(3) The table element moving part 42 searches for location information (that is, the home address and the CoA of the mobile node) corresponding to the reported address of the MAP function router 50 from the MAP table part 41.

(4) The MAP table part 41 reports location information obtained from the search to the table element moving part 42.

(5) The table element moving part 42 transmits a location information transfer request including the reported location information and a MAP function activation request to the MAP function router 50.

(6) The MAP function router 50 activates a MAP function part 51, and a MAP function router table part 52 is assigned to the MAP function router 50.

(7) The MAP function part 51 transfers requested location information to the MAP function router table part 52.

(8) The MAP function part 51 reports completion of the transfer of the location information to the MAP 40. Thereby, the MAP function router 50 newly operates as a substitute for the MAP 40 and newly forms (provides) a hierarchical domain.

(9) After receiving the report of completion of the location information transfer, the table element moving part 42 requests deletion of the transferred location information to the MAP table part 41. Accordingly, the MAP table part 41 deletes the requested location information.

Figure 8:
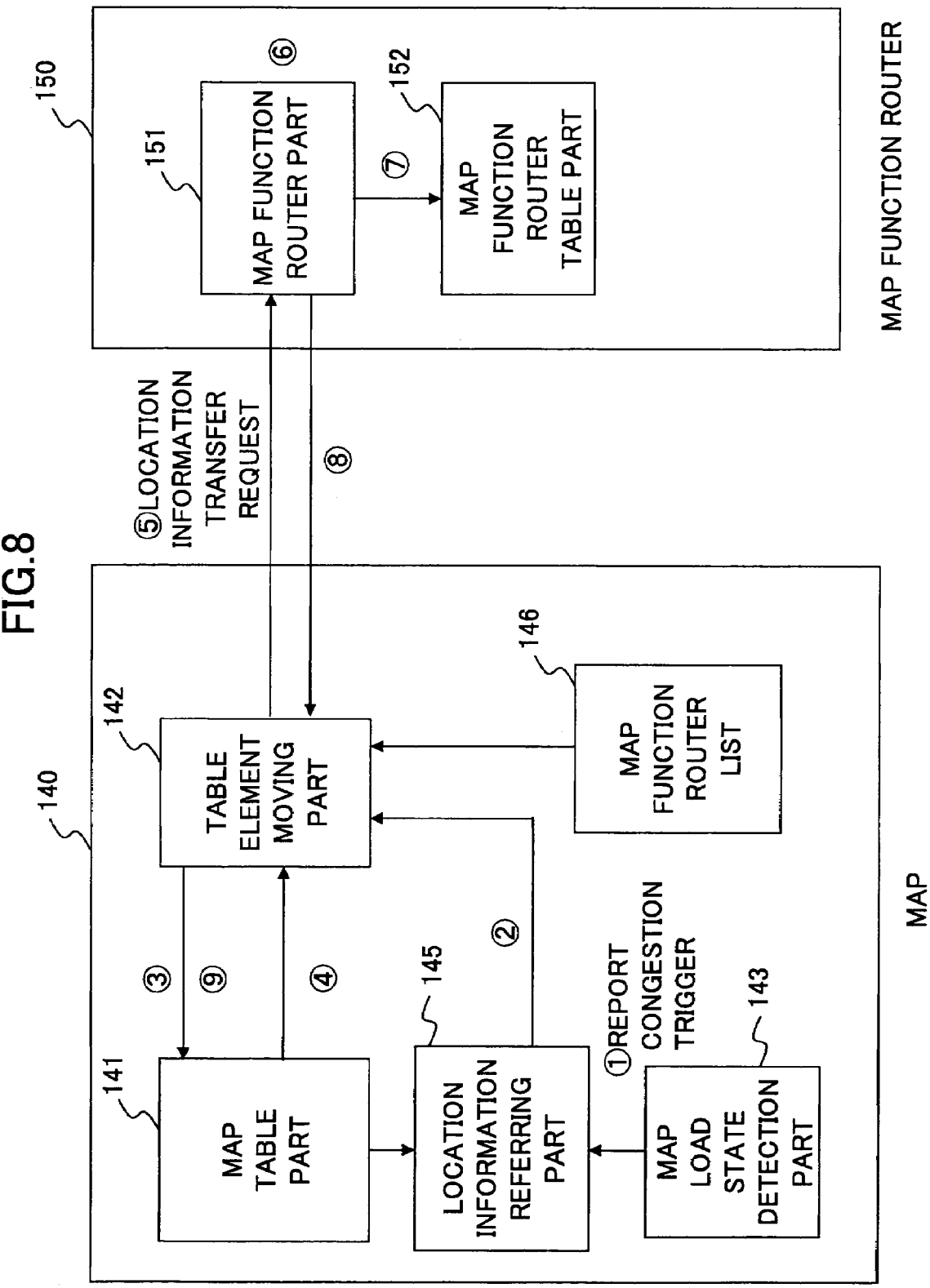
FIG. 8 is a drawing showing a configuration of a mechanism of a second embodiment of the present invention.

FIG. 8 is a diagram showing a structural configuration of a second embodiment of a method of the present invention. In FIG. 8, a MAP 140 includes a table part 141, a table element moving part 42, a MAP load state detection part 43, and a location information referring part 45.

Next, the numbers represented with circles in FIG. 8 are described in correspondence with the following numbers represented with brackets.

(1) The MAP 140 reports a congestion trigger to the location information referring part 145 when the MAP load state detection part 143 detects congestion.

The location information referring part 145 monitors the MAP table part 141 in units of time.

(2) The location information referring part 145 refers to location information of a mobile node having the largest number of times of reference made per unit of time and reports the mobile node to the table element moving part 142.

(3) The table element moving part 142 searches for location information of the mobile node reported by the location information referring part 145 from the MAP table part 141.

(4) The MAP table part 141 reports the location information obtained from the search to the table element moving part 142.

All of the MAP function routers which are located in the same hierarchical domain as the MAP are registered in a MAP function router list 146.

(5) The table element moving part 142 selects a MAP function router, such as MAP function router 150, that is presently not operating as a MAP but operating as a router from the MAP function router list 146, and transmits a location information transfer request including the location information reported from the table part 141 and a MAP function activation request to the selected MAP function router 150.

(6) The MAP function router 150 activates a MAP function part 151, and a MAP function router table part 152 is assigned in the MAP function router 150.

(7) The MAP function part 151 transfers the requested location information to the MAP function router table part 152.

(8) The MAP function part 151 reports completion of the transfer of the location information to the MAP 140. Thereby, the MAP function router 150 newly operates as a substitute for the MAP 140 and newly forms (provides) a hierarchical domain.

(9) After receiving the report of completion of the location information transfer, the table element moving part 142 requests deletion of the transferred location information to the MAP table part 141. Accordingly, the table part 141 deletes the requested location information.

Figure 9:
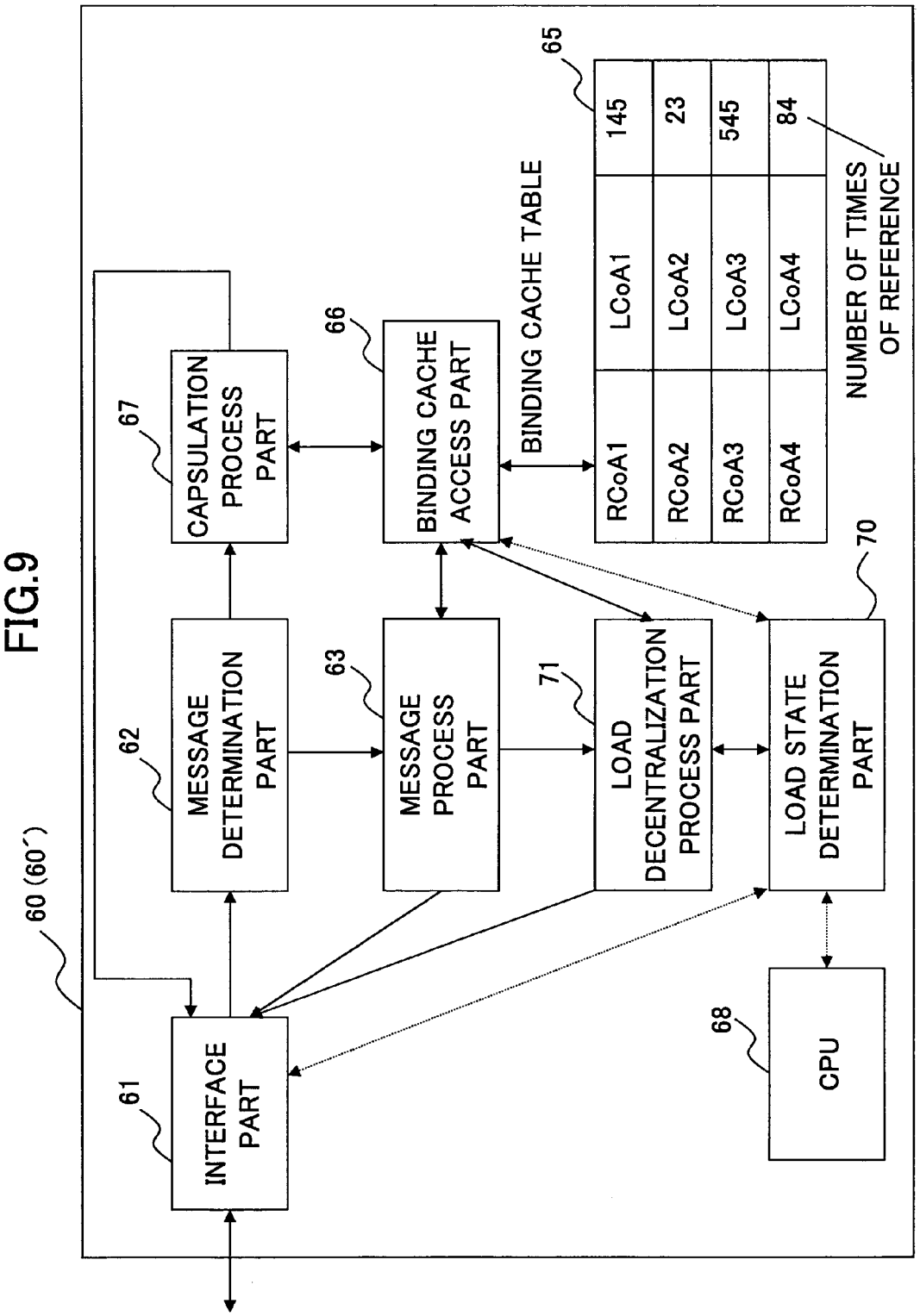
FIG. 9 is a block diagram of an embodiment of a MAP and a MAP function router according to the present invention.

FIG. 9 is a block diagram showing a MAP 60 (MAP function router 60') according to an embodiment of the present invention. It is to be noted that the MAP 60 and the MAP function router 60' are configured in a same manner.

In FIG. 9, an interface part 61 in a MAP 60 executes transmission and reception of packets. A message determination part 62 determines whether the packet received by the interface part 61 is packet including a message that is to be processed in the MAP 60 or a packet including another message destined for a mobile node. Then, according to the determination of the message determination part 62, a message process part 63 executes processing of the message.

A binding cache table 65 stores location information of a mobile node(s). A binding cache access part 66 executes a writing process and a reading process with respect to the binding cache table 65. A capsulation process part 67 capsulates packet(s) destined (addressed) to the mobile node. A CPU 68 controls the entire MAP 60.

Furthermore, in the MAP 60 according to an embodiment of the present invention, a load determination part 70 determines the amount of load of the MAP 60. A load decentralization process part 71 receives a determination result from the load determination part 70, and performs load decentralization with respect to the MAP function router 60'.

First, processing of data packets(s) addressed to a mobile node(s) is described. When the interface part 61 of the MAP 60 receives a data packet addressed to the mobile node, the packet is delivered to the message determination part 62, Here, it is determined whether the packet is a process target. According to the result of the determination, the packet is distinguished as a packet being other than a control-related message. It is to be noted that the determination of whether the packet is a message addressed to the MAP 60 by determining whether destination address of the packet is the MAP 60.

The packet other than the message addressed to the MAP is subject to a search from the binding cache table 65 by the binding cache access part 66. Here, the search key is a destination IP address of the received packet. The binding cache table 65 stores information required for capsulation (e.g. IP address of the capsulation destination).

The binding cache table 65 includes RCoA (virtual IP address of the mobile node connected on the link of the MAP) as the search key(s). The binding cache table 65 also includes LCoA (IP address presently used by the mobile node). It is to be noted that FIG. 9 is illustrated on the basis that a basic of the hierarchical mobile IPv6 is employed. The reference number included in the binding cache table 65 represents the number of times of reference (number of times reference made) to a corresponding entry for executing an capsulation process. The reference number is used for determining which information to transfer to another MAP function router in a case where the load of the MAP 60 is large.

When a hit is found in searching through the binding cache table 65, a capsulation process part 67 executes a capsulation process by using the search results, and outputs the capsulated packets to the interface part 61. The capsulation process is a process of where the MAP 60, receiving an original data transmitted from a correspondent node, adds the address of the original sender and the destination address to the original data for transferring the original data to the final destination. In this manner, the MAP 60 capsulates and transfers the packets addressed to the mobile node.

Next, processing of message(s) addressed to a MAP 60 is described. A received packet is distinguished by the message determination part 62. Then, according to the determination of the message determination result, the message process part 63 executes, for example, a code normality check, or a binding cache table update according to the content of the received message. Furthermore, the message process part 63 may also generate, when necessary, a response message in response to the received message.

The load determination part 70 determines whether the load of the MAP 60 is greater or equal to a predetermined threshold. In a case where the load greater or equal to the threshold, the load determination part 70 reports to the load decentralization part 71 that the load is in a state exceeding the threshold. Having received the report, the load decentralization part 71 transfers a part of an entry of the binding cache table 65 in the MAP 60 to another MAP function router 60', thereby enabling reduction of the load of the MAP 60.

Next, the load determination part 70 is described in detail. The load determination part 70 periodically checks (monitors) the load of the MAP 60 and stores the check results. As for methods of checking the load, there is, for example, a method of using a CPU usage rate, a method of using a line usage rate, or a method of using an binding cache entry count.

Typically, a network node includes an interface for measuring the CPU usage rate or the line usage rate. Accordingly, the load determination part 70 periodically monitors such rates, and reports to the load decentralization process part 71 that the load exceeds the threshold, for example, when the CPU usage rate exceeds 50% or when the line usage rate exceeds 50%.

Furthermore, since the MAP 60 manages the binding cache table 65, the MAP 60 can monitor the percentage of the binding cache table 65 that is being used. By using this information, or combining this information with other information, the load determination part 70 determines whether the load exceeds the threshold.

Figure 10:
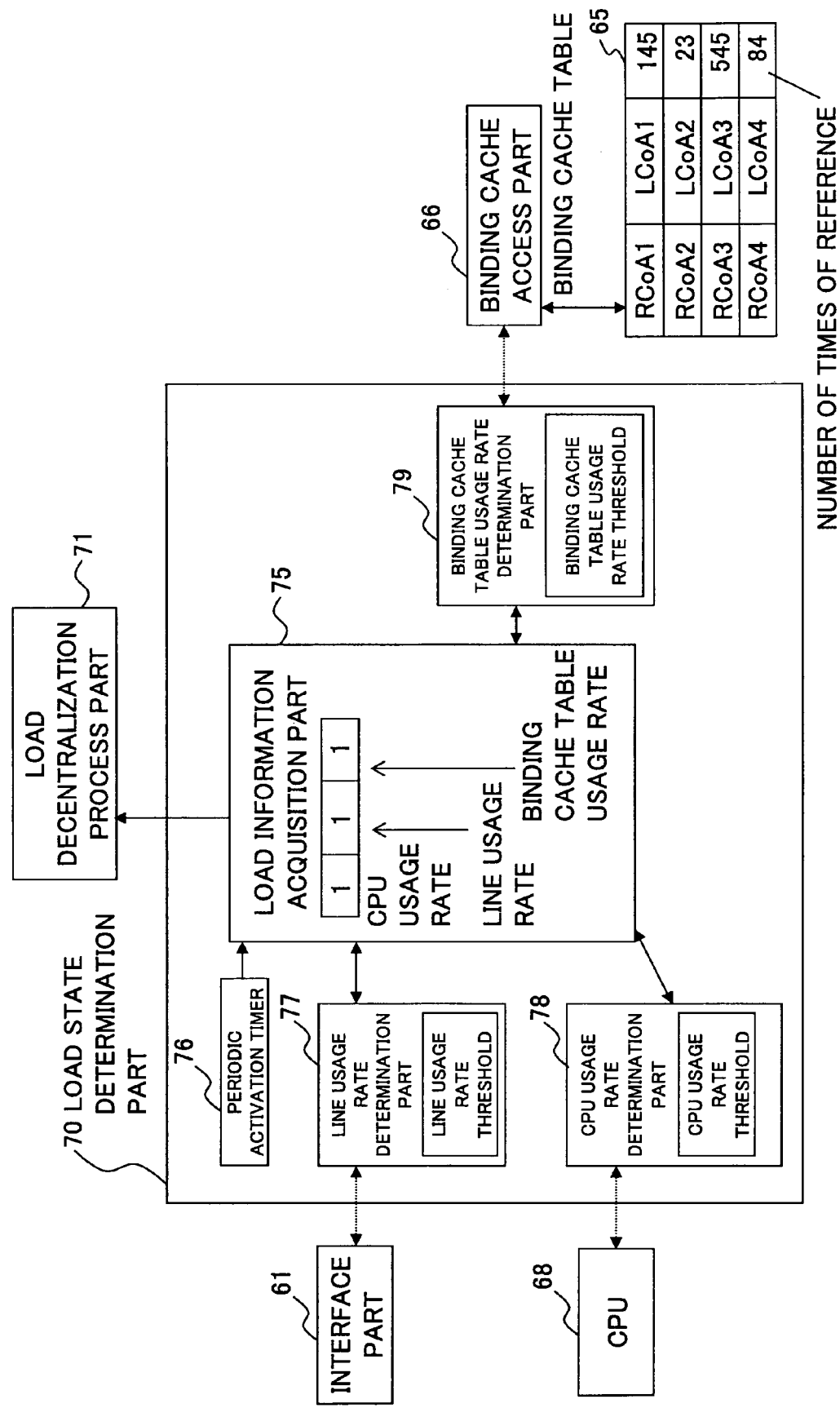
FIG. 10 is a block diagram showing an embodiment of a load state determination part.

FIG. 10 is a block diagram showing an embodiment of the load determination part 70. The load determination part 70 includes a load information acquisition part 75, a periodic activation timer 76, a line usage rate determination part 77, a CPU usage rate determination part 78, and a binding cache table usage rate determination part 79. The periodic activation timer 76 periodically (e.g. one cycle per minute) reports to the load information acquisition part 75 that it is time for commencing a periodic monitoring operation. The load information acquisition part 75 requests the line usage rate determination part 77, the CPU usage rate determination part 78, and the binding cache table usage determination part 79 to acquire corresponding information.

The line usage rate determination part 77, the CPU usage rate determination part 78, and the binding cache table usage determination part 79 respectively are stored with a threshold (s) to be used as reference for determination. The line usage rate determination part 77, the CPU usage rate determination part 78, and the binding cache table usage determination part 79 respectively compare their present usage rates (load) with their thresholds and reports respective acquired results data indicative of whether their load exceeds the thresholds to the load information acquisition part 75. The load information acquisition part 75 stores the acquired information results until the next monitoring period. Furthermore, if any one of the usage rates exceeds the corresponding threshold, the load information acquisition part 75 reports to the load decentralization process part 71 the load is in a state exceeding the threshold(s).

Figure 11:
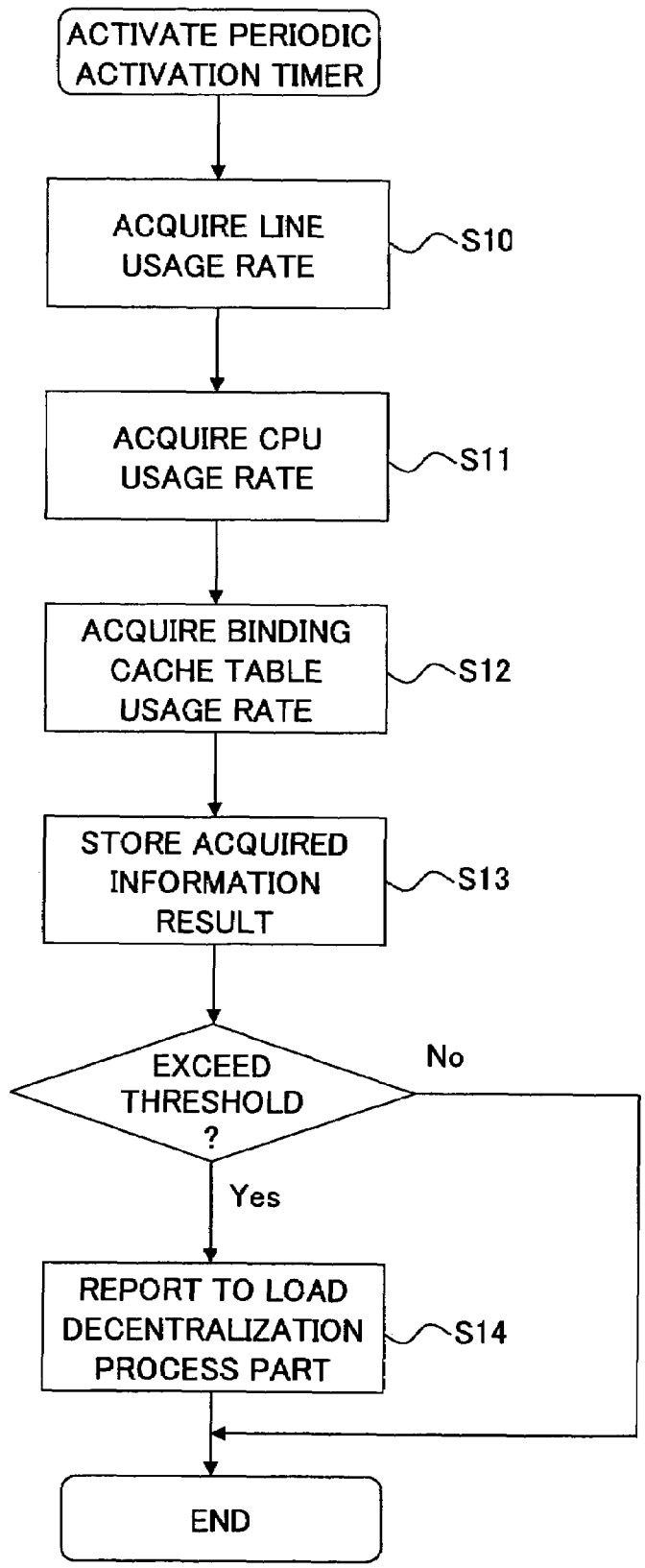
FIG. 11 is a flowchart for describing an operation of a load state determination part.

FIG. 11 is a flowchart for describing operation of the load determination part 70. In FIG. 11, the load determination part 70 executes line usage rate acquisition (Step S10), CPU usage rate acquisition (Step S11), and binding cache table usage rate acquisition (Step S12). Then, the load determination part 70 stores acquired information results (Step S13). Then, the load determination part 70 determines whether the usage rates exceed the thresholds based on the acquired information results. When any one of the usage rates exceeds the corresponding thresholds, the load determination part 70 reports the exceeding state to the load decentralization process part 71 by using its own load state cache (MAP load state cache) (Step S14).

Figure 12:
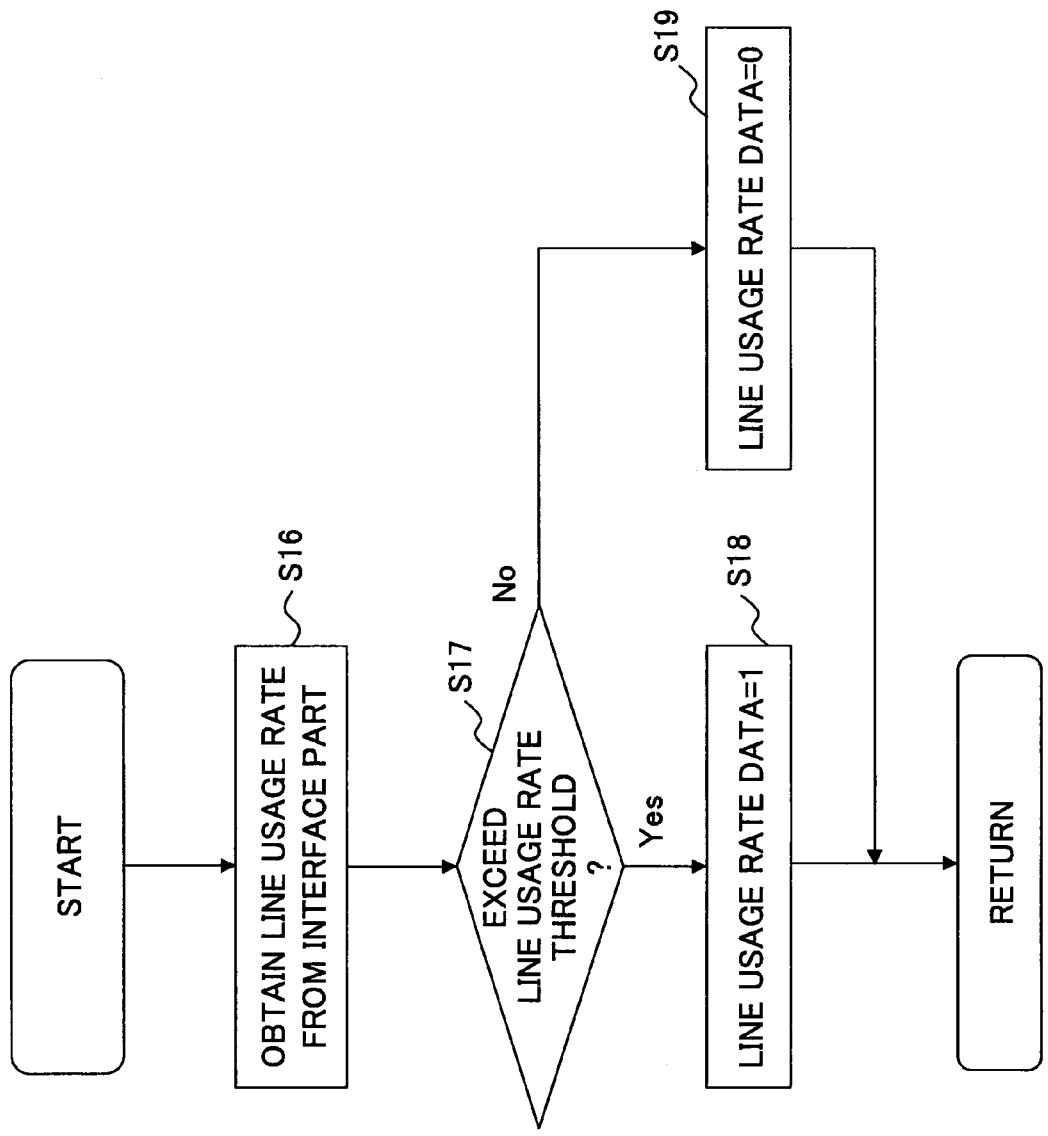
FIG. 12 is a flowchart showing a line usage rate acquisition process.

FIG. 12 is a flowchart for describing the line usage rate acquisition operation executed by the line usage rate determination part 77 in Step S10. In FIG. 12, the line usage rate determination part 77 obtains a line usage rate from the interface part 61 (Step S16), and determines whether the obtained line usage rate exceeds a line usage rate threshold (Step S17). Here, the line usage rate data is set to 1 when the obtained line usage rate exceeds the line usage rate threshold (Step S18), and the line usage rate data is set to 0 when the obtained line usage rate does not exceed the line usage rate threshold (Step S19).

Figure 13:
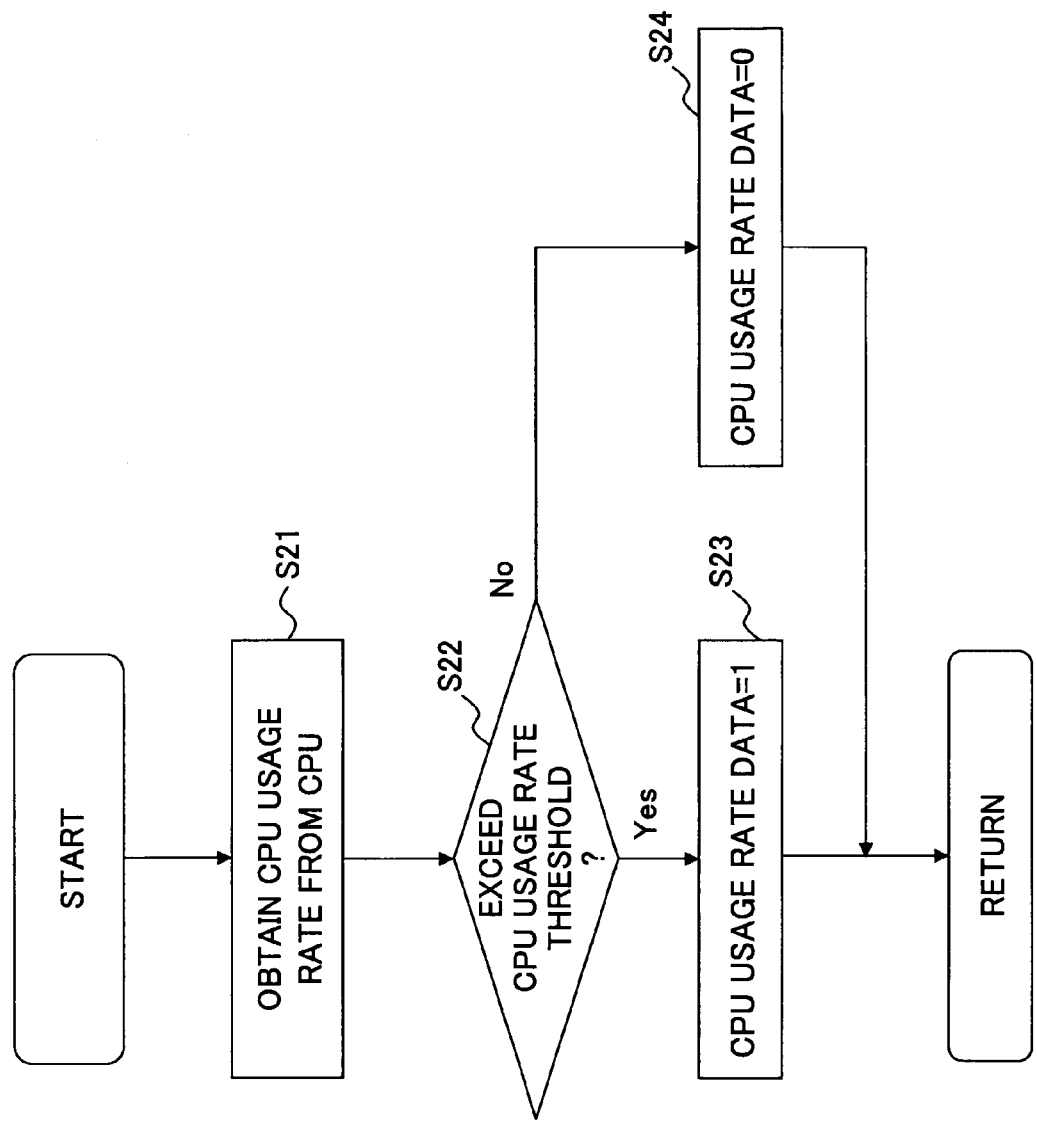
FIG. 13 is a flowchart showing a CPU usage rate acquisition process.

FIG. 13 is a flowchart for describing the CPU usage rate acquisition operation executed by the CPU usage rate determination part 78. In FIG. 13, the CPU usage rate determination part 78 obtains a CPU usage rate from the CPU 68 (Step S21), and determines whether the obtained CPU usage rate exceeds a CPU usage rate threshold (Step S22). Here, the CPU usage rate data is set to 1 when the obtained CPU usage rate exceeds the CPU usage rate threshold (Step S23), and the CPU usage rate data is set to 0 when the obtained line usage rate does not exceed the CPU usage rate threshold (Step S24).

Figure 14:
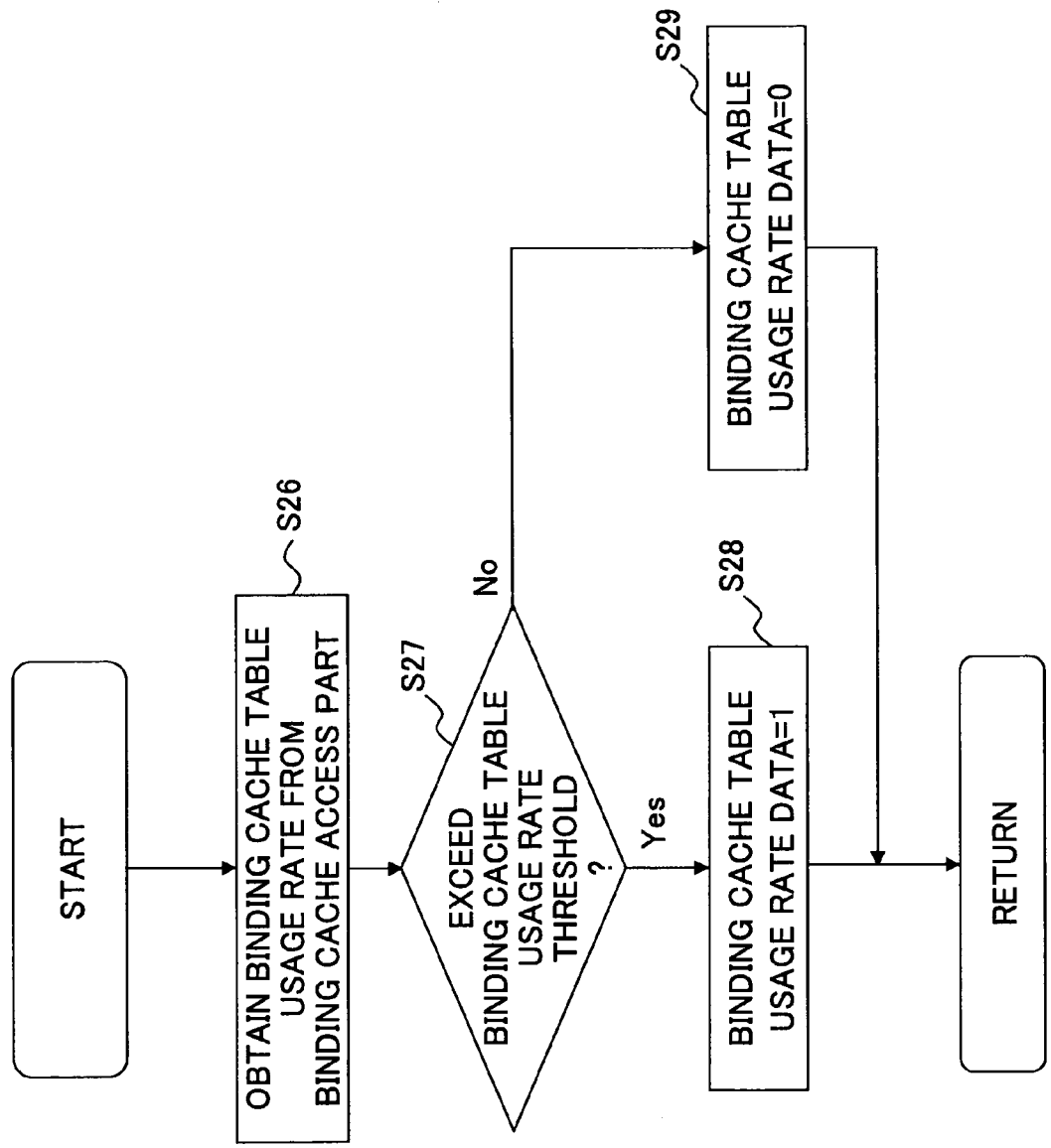
FIG. 14 is a flowchart showing a binding cache table usage rate acquisition process.

FIG. 14 is a flowchart for describing the binding cache table usage rate acquisition operation executed by the binding cache table usage rate determination part 79. In FIG. 14, the binding cache table usage rate determination part 79 obtains a binding cache table usage rate from the binding cache access part 66 (Step S26), and determines whether the obtained the binding cache table usage rate exceeds a binding cache table usage rate threshold (Step S27). Here, the binding cache table usage rate data is set to 1 when the obtained the binding cache table usage rate exceeds the binding cache table usage rate threshold (Step S28), and binding cache table usage rate data is set to 0 when the obtained binding cache table usage rate does not exceed the binding cache table usage rate threshold (Step S29).

Next, the load decentralization process part 71 is described in detail. The load decentralization process part 71 includes the following functions. The first function is acquiring load state information of a MAP function router(s). The second function is responding to a load state inquiry(ies) from a MAP function router. The third function is determining to which MAP function router should the load be moved (decentralized). The fourth function is determining which of binding cache entries should be moved (transferred) to the MAP function router. The fifth function is transferring a binding cache entry(ies) to the MAP function router.

Figure 15:
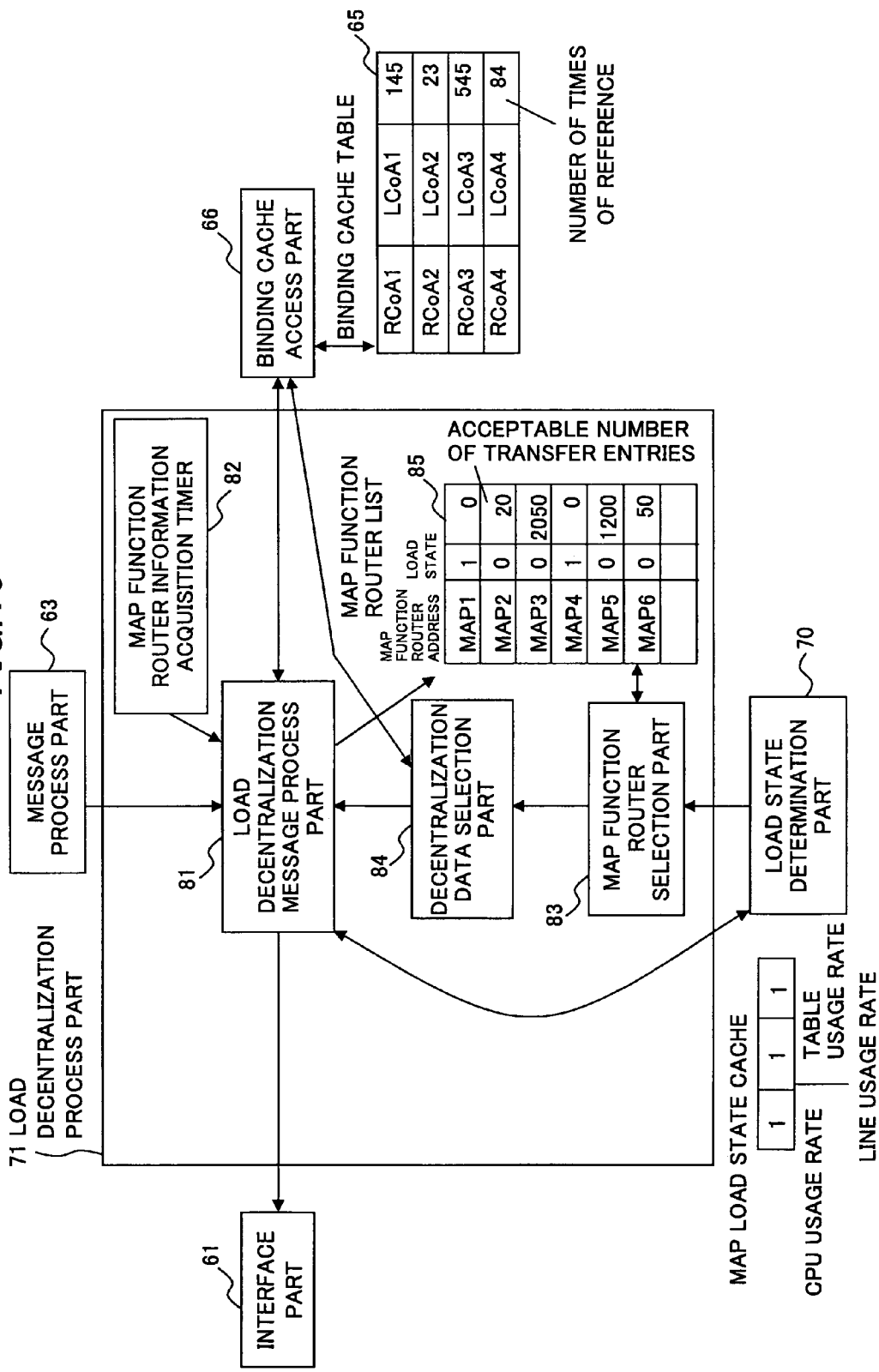
FIG. 15 is a block diagram showing an embodiment of a load decentralization process part.

FIG. 15 is a block diagram showing an embodiment of the load decentralization process part 71. In FIG. 15, the load decentralization process part 71 includes a load decentralization message process part 81, a MAP function router information acquisition timer 82, a MAP function router selection part 83, a decentralization data selection part 84, and a MAP function router list 85.

The MAP function router list 85 includes a space for storing addresses of MAP function routers targeted for inquiry (MAP addresses), load state information of each MAP function router (O represents low load, 1 represents high load), and number of transferable entries of each MAP function router. Here, predetermined addresses are employed for the addresses of the MAP function routers. It is to be noted that the MAP function router list 85 can be dynamically updated by extending an existent routing protocol or a multicast protocol.

Figure 16:
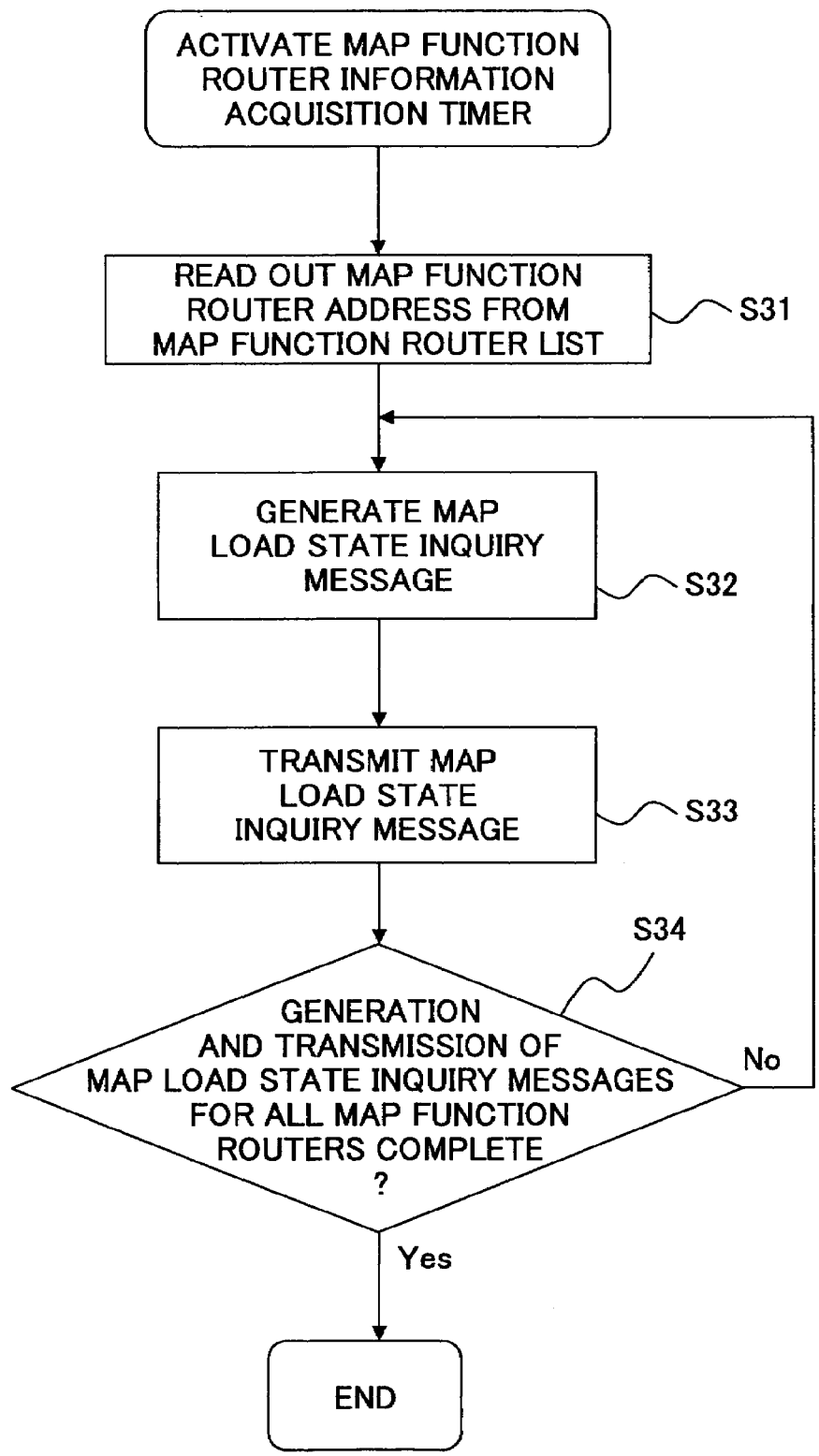
FIG. 16 is a flowchart for describing a function of acquiring load state information.

First, the first function of acquiring load state information of MAP function routers is described with reference to the flowchart shown in FIG. 16. The MAP function router information acquisition timer 82 periodically activates (e.g. every 1 minute) the load state acquisition function.

The load decentralization message process part 81 reads out a MAP function router address (addresses) from the MAP function router list 85 (Step S31), generates MAP load state inquiry message destined for the read out MAP function router address (Step S32), and transmits the generated message (Step S33). The load decentralization message process part 81 repeats the Steps S32 and S33 until the messages are transmitted to all MAP function routers registered in the MAP function router list 85 (Step S34).

The MAP function router 60' responds to the MAP load inquiry message by transmitting a MAP load response message including load state information (e.g. possibility of transfer, number of acceptable transfers if transfer is possible) of the MAP function router 60'. The MAP 60 receiving the MAP load response message updates the MAP function router list 85 by overwriting the content of the MAP load response message thereto. Accordingly, the MAP function router list 85 can be periodically updated.

Figure 17:
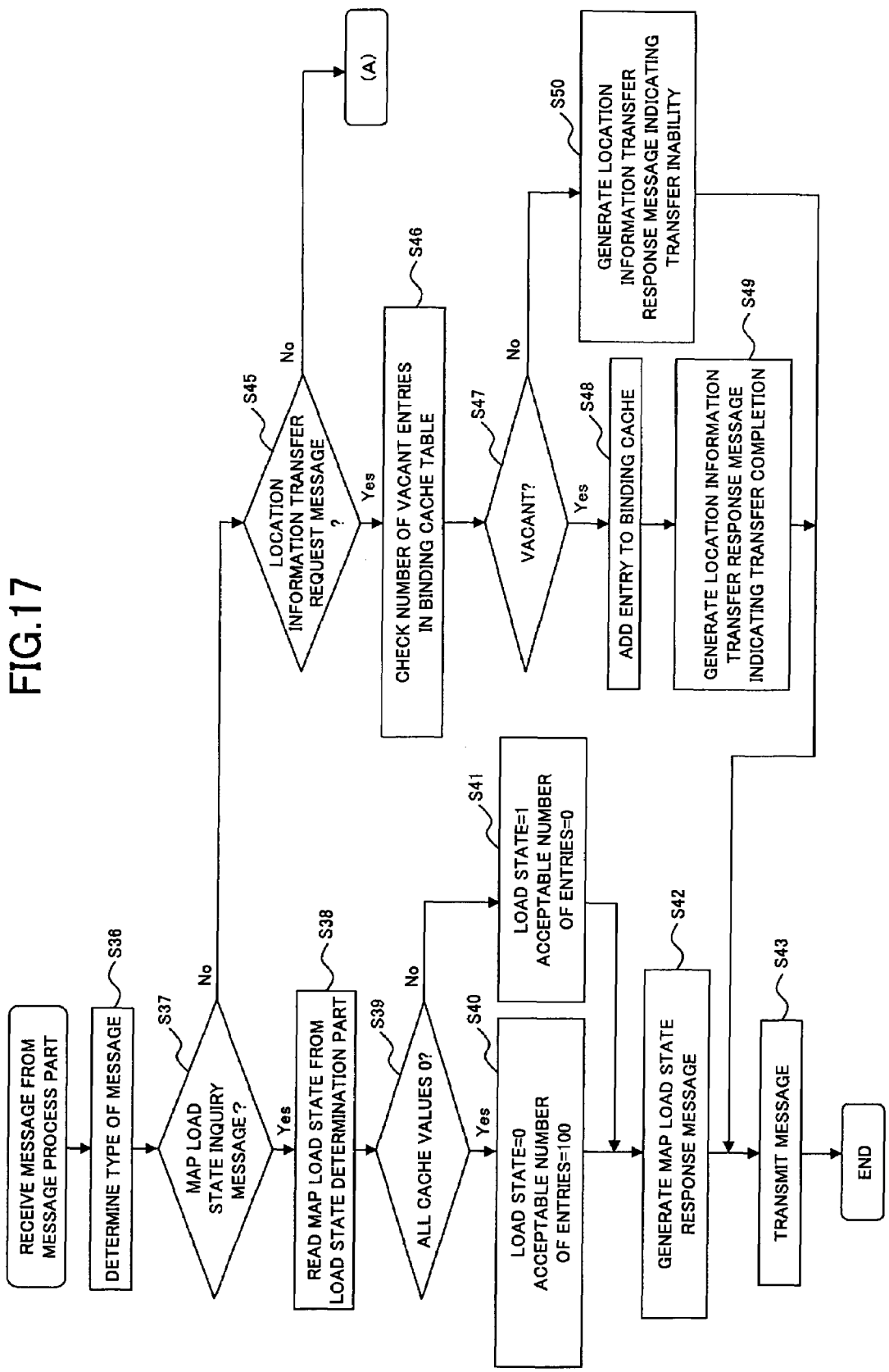
FIG. 17 is a flowchart for describing a function of responding to a load state inquiry message.

Next, the second function of responding to a load state inquiry from a MAP or a MAP function router is described with reference to the flowcharts shown in FIGS. 17 and 18.

The load decentralization process part 71, upon receiving a message from the message process part 63, determines the type of the received message (Step S36) to see whether it is a MAP load state inquiry message (Step S37).

The load decentralization process part 71 reads out its own MAP load state, that is, its own MAP load state cache from the load state determination part 70 (Step S38). The load decentralization process part 71 determines whether all of the values of its MAP load state cache are 0 (Step S39). In a case where all of the values are 0, the MAP function router 60' is able to accept transfer. Accordingly, the load decentralization process part 71 sets the number of acceptable entries for transfer (Step S40). In a case where not all of the values are 0, the MAP function router 60' is unable to accept transfer. Here, the load decentralization process part 71 sets the number of acceptable entries as 0 (Step S41). The load decentralization process part 71 generates a MAP load state response message based on the setting (Step S42), and transmits the generated message (Step S43).

The amount of acceptable entries may be of a fixed predetermined number (e.g. 100 entries). Alternatively, the amount of acceptable entries may be calculated by a vacancy percentage of the binding cache table (e.g. 50% vacant entries).

In a case where the received message is not a MAP load state inquiry message according to Step S37, the load decentralization process part 71 determines whether the message is a location information transfer request message (Step S45). In a case where the message is the location information transfer request message, the load decentralization process part 71 checks the number of vacant entries in the binding cache table 65 (Step S46). When there is vacancy in the binding cache table 65 for accepting transfer of location information (Yes in Step S47), the location information is transferred to the binding cache table 65 and a new entry is added thereto (Step S48). The load decentralization process part 71 generates a location information response message indicating completion of the transfer (Step S49). When there is no vacancy in the binding cache table 65 for accepting transfer of location information (No in Step S47), the load decentralization process part 71 generates a location information response message indicating inability to transfer the location information (Step S50). Then, the load decentralization process part 71 transmits the above-described messages (Step S43).

Figure 18:
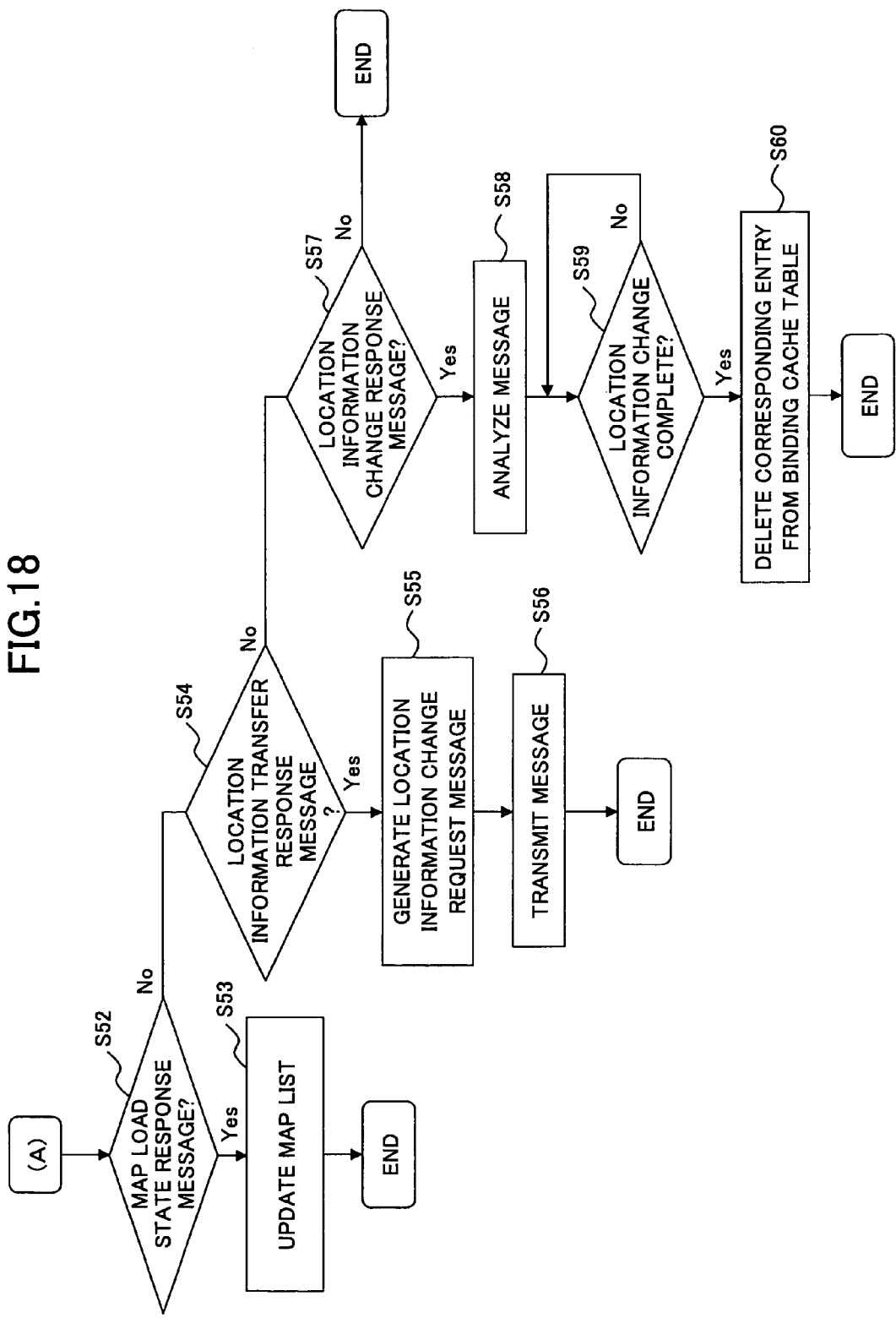
FIG. 18 is a flowchart for describing a function of responding to a load state inquiry message.

Furthermore, in a case where the received message is not a location information transfer request message according to Step S45, the load decentralization process part 71 determines whether the message is a MAP load state response message (Step S52 shown in FIG. 18). When the message is the MAP load state response message, the load decentralization process part 71 updates the MAP function router list 85 in accordance with the content of the response message (Step S53).

Furthermore, in a case where the received message is not a MAP load state response message according to Step S52, the load decentralization process part 71 determines whether the message is a location information transfer response message (Step S54). When the message is the location information transfer response message, the load decentralization process part 71 generates a location information change request (response) message for a corresponding mobile node (Step S55) and transmits the generated message (Step S56).

Furthermore, in a case where the received message is not a location information transfer response message, the load decentralization process part 71 determines whether the message is a location information change request message (Step S57). When the message is the location information change request message, the load decentralization process part 71 analyzes the message (Step S58) and changes (registers) the location information (Step S59). After the change of location information is completed, the load decentralization process part 71 deletes the corresponding entry from the binding cache table 65 (Step S60).

Figure 19:
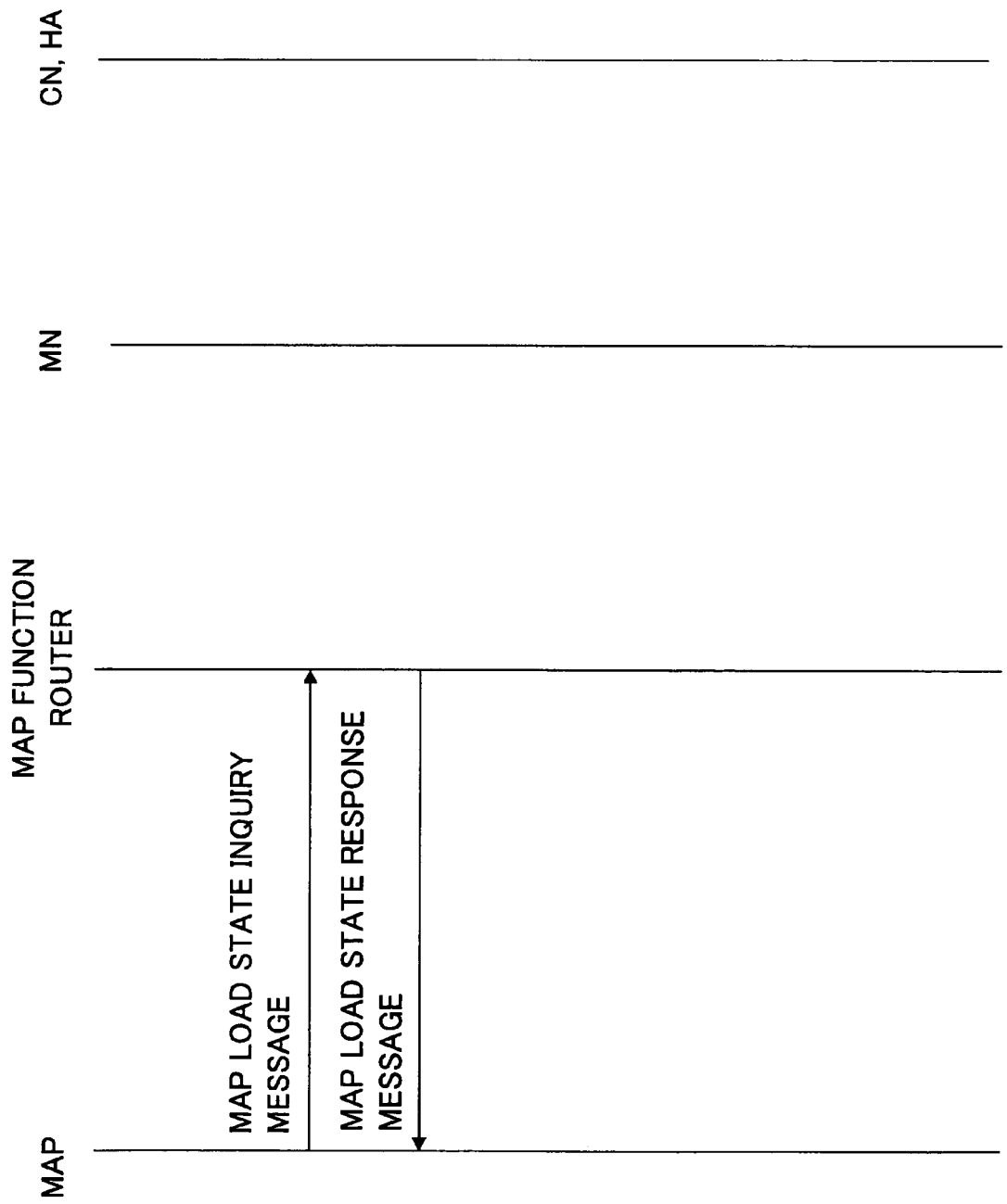
FIG. 19 is a drawing showing a message sequence in inquiring load state information.

FIG. 19 shows a message sequence when inquiring a load state. In FIG. 19, a load state inquiry message having a format shown in FIG. 20 is transmitted from the MAP 60 to the MAP function router 60', and a load state response message having a format shown in FIG. 21 is returned from the MAP function router 60'.

Figure 20:
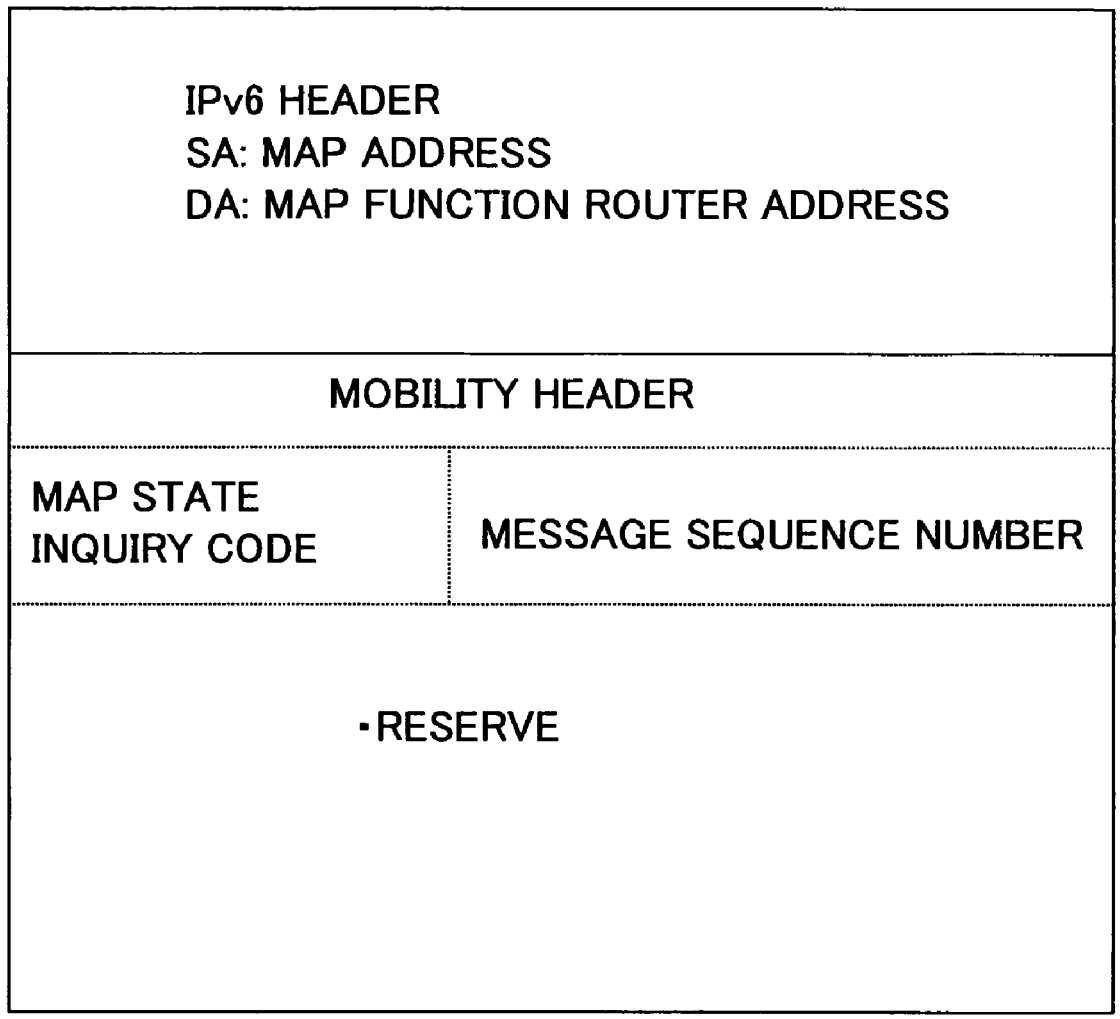
FIG. 20 is a drawing showing a format of a load state inquiry message.
Figure 21:
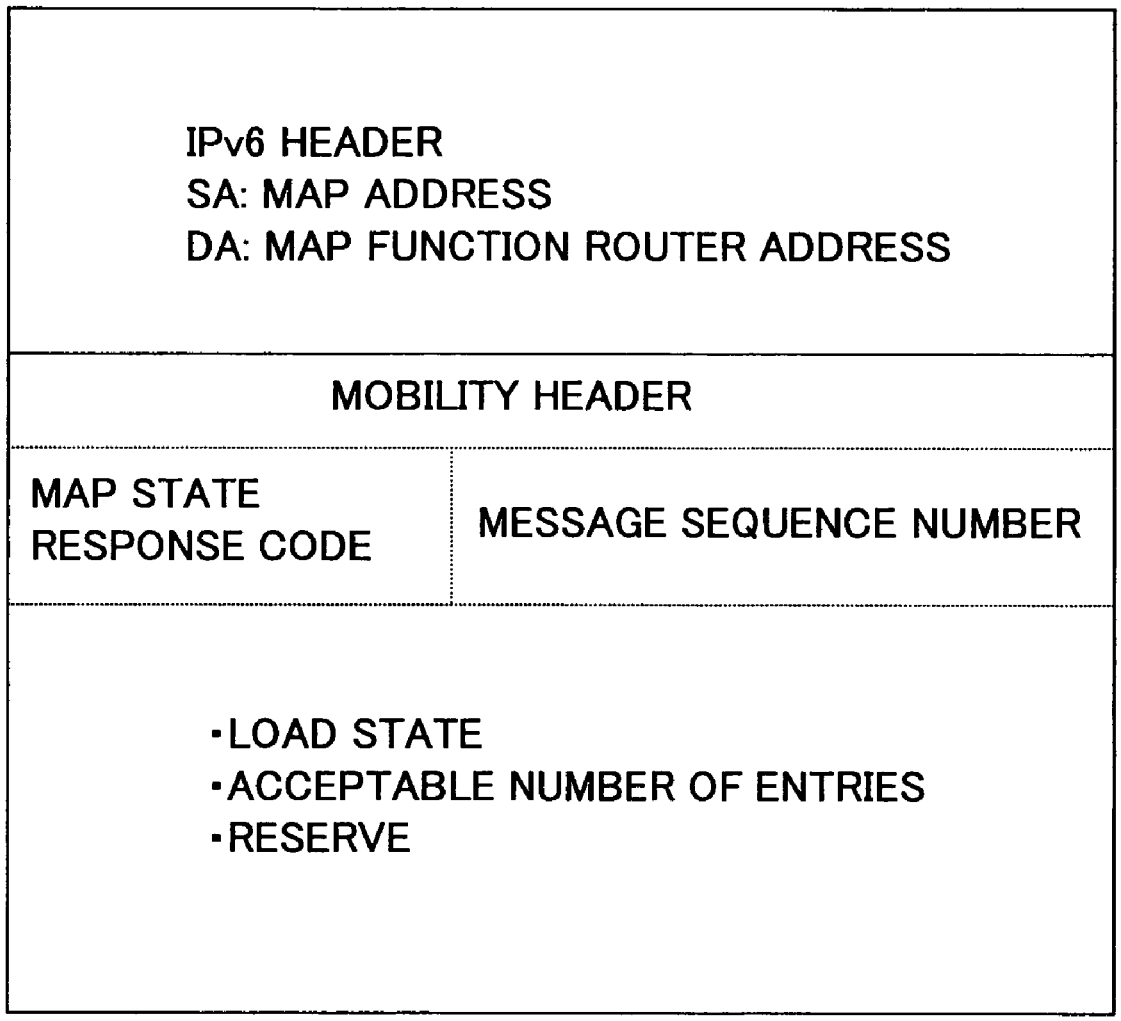
FIG. 21 is a drawing showing a format of a load state response message.

The messages shown in FIGS. 20 and 21 are exemplary messages that are defined by a mobility header subsequent to the IPv6 header, in which a code showing the type of message and a sequence number of each message are applied thereto. Furthermore, the load state response message shown in FIG. 21 also includes load state of the MAP function router and the number of acceptable entries.

Figure 22:
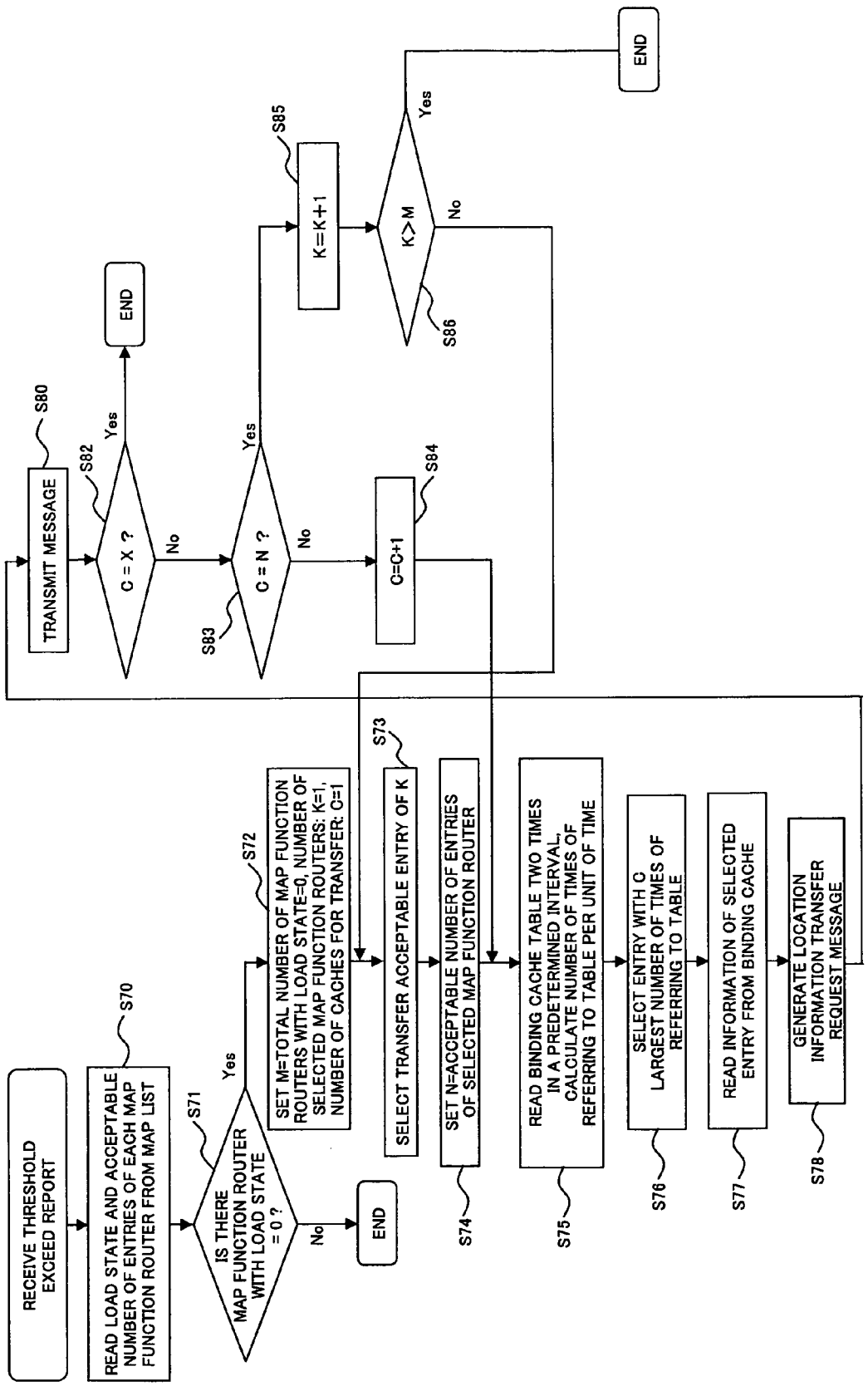
FIG. 22 is a flowchart for describing a function of determining a MAP function router for receiving the decentralized load and determining an entry in a binding cache table that is to be transferred to the MAP function router.

Next, the third function of determining which MAP function router 60' should receive the load from the MAP 60 and the fourth function of determining which entry in the binding cache table should be moved (transferred) to the MAP function router 60' are described with reference to FIG. 22.

The MAP function router selection part 83 reads out the load state and the number of acceptable entries of each MAP function router 60' from the MAP function router list 85 (Step S70), and determines whether there are any MAP function routers 60' having a load state which is 0 (Step S71).

When there is a MAP function router(s) 60' having a load state of 0, the load decentralization process part 71 sets the total number of MAP function routers 60' having a 0 load state as "M", sets the selected MAP function router number K as "1", and sets the cache transfer number C as "1" (Step S72). The load decentralization process part 71 selects a transferable entry that is $K^{th}$ in the MAP function router list 85 (Step S73). The load decentralization process part 71 sets the transferable entry number of the selected MAP function router 60' as a variable "N". It is to be noted that the cache transfer number C indicates the number of caches required to be transferred to the MAP function router 60'. The cache transfer number C is maintained in the MAP being the origin of transferring the cache.

Next, the decentralization data selection part 84 reads the binding cache table 65 two times in an interval of a predetermined unit of time (e.g. 10 seconds) and calculates the number of times of referring to each entry in the binding cache table 65 per unit of time (Step S75). The decentralization data selection part 84 selects an entry having the $C^{th}$ largest number of times of reference (Step S76), reads information of the selected entry in the binding cache table 65 (Step S77), generates a location information transfer request message (Step S78), and transmits the generated location information transfer request message (Step S80).

Next, it is determined whether C=X is satisfied (Step S82). Here, X represents the number of entries to be transferred (moved) according to a single congestion report, for example, X=100. If C=X is satisfied the decentralization process is finished. If C=X is not satisfied, there are still entries that are to be moved (transferred). Accordingly, it is determined whether C=N is satisfied (Step S83). If C=N is not satisfied, the cache transfer number C is incremented by 1 and the process proceeds to Step S75 (Step S84).

If C=N is satisfied, the selected number of MAP function routers K is incremented by 1 (Step S85). Next, it is determined whether K>M is satisfied (Step S86). If K>M is not satisfied the process proceeds to Step S73 (No in Step S86). If K>M is satisfied, the process is finished since there are no MAP function routers left to be selected (Yes in Step S86).

Accordingly, in determining the MAP function router to which an entry in the binding cache table is to be transferred, the value of the load state in the MAP function router list 85 is referred, and the MAP function router having the largest number of acceptable entries is selected. Furthermore, in determining which binding cache to transfer to the MAP function router, the number of times of reference for each entry is read out from the binding cache table 65 in a periodic interval of 10 seconds. Since the number of times of reference shows how many times reference has been made for executing a capsulation process of data packets, the number of times of reference is read out two times, and the number of times of reference during a period of 10 seconds is calculated. An entry having a largest reference number means that the entry is frequently used in communication. Therefore, by transferring this entry to another MAP function router, the load of the MAP can be reduced efficiently.

Alternatively, other than the method of selecting entries in the order of entries having large reference numbers, a method of selecting entries in the order of entries exceeding a predetermined threshold or a method of preferentially selecting an entry with a short life time may be employed. Thereby, it can be determined which MAP function router 60' should receive the load of the MAP 60 and which entry to transfer to the MAP function router 60'.

Next, the fifth function of transferring a binding cache entry (entries) to the MAP function router(s) 60' is described. In this function, a location information transfer request message is generated according to the transfer information determined in the above-described manner, and the message is transmitted to the MAP function router 60'.

Figure 23:
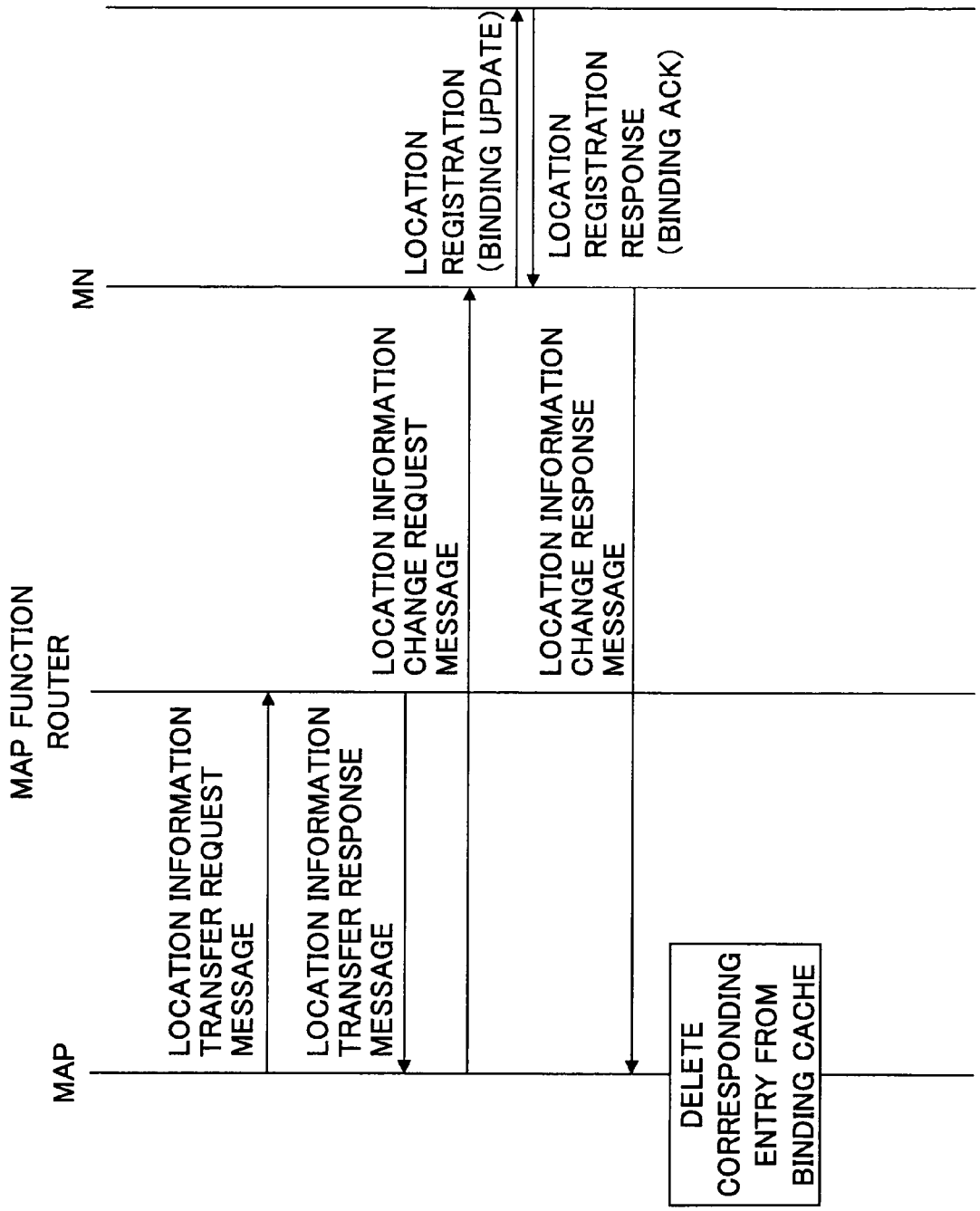
FIG. 23 is a drawing showing a message sequence in transferring a binding cache.
Figure 24:
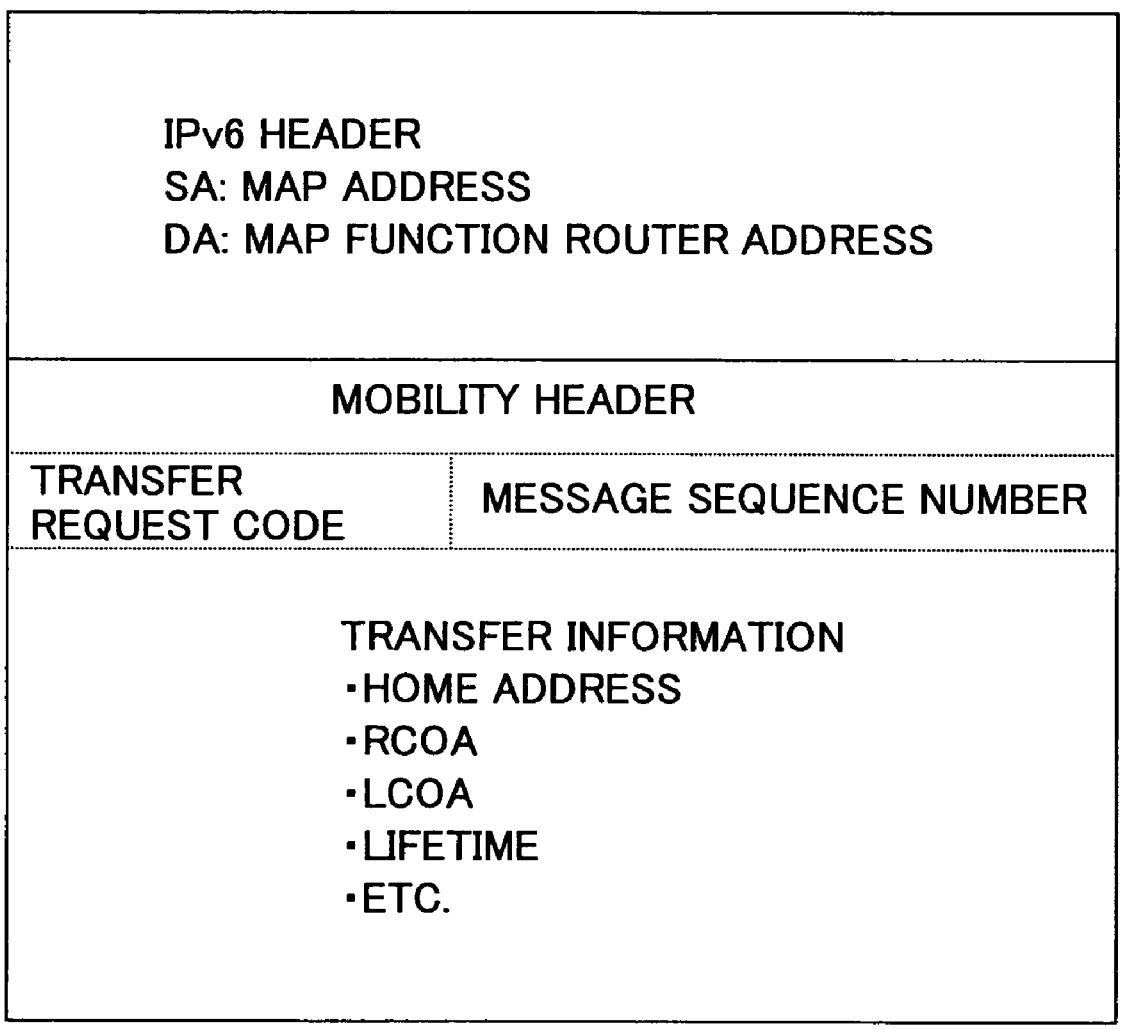
FIG. 24 is a drawing showing a format of a location information transfer request message.
Figure 25:
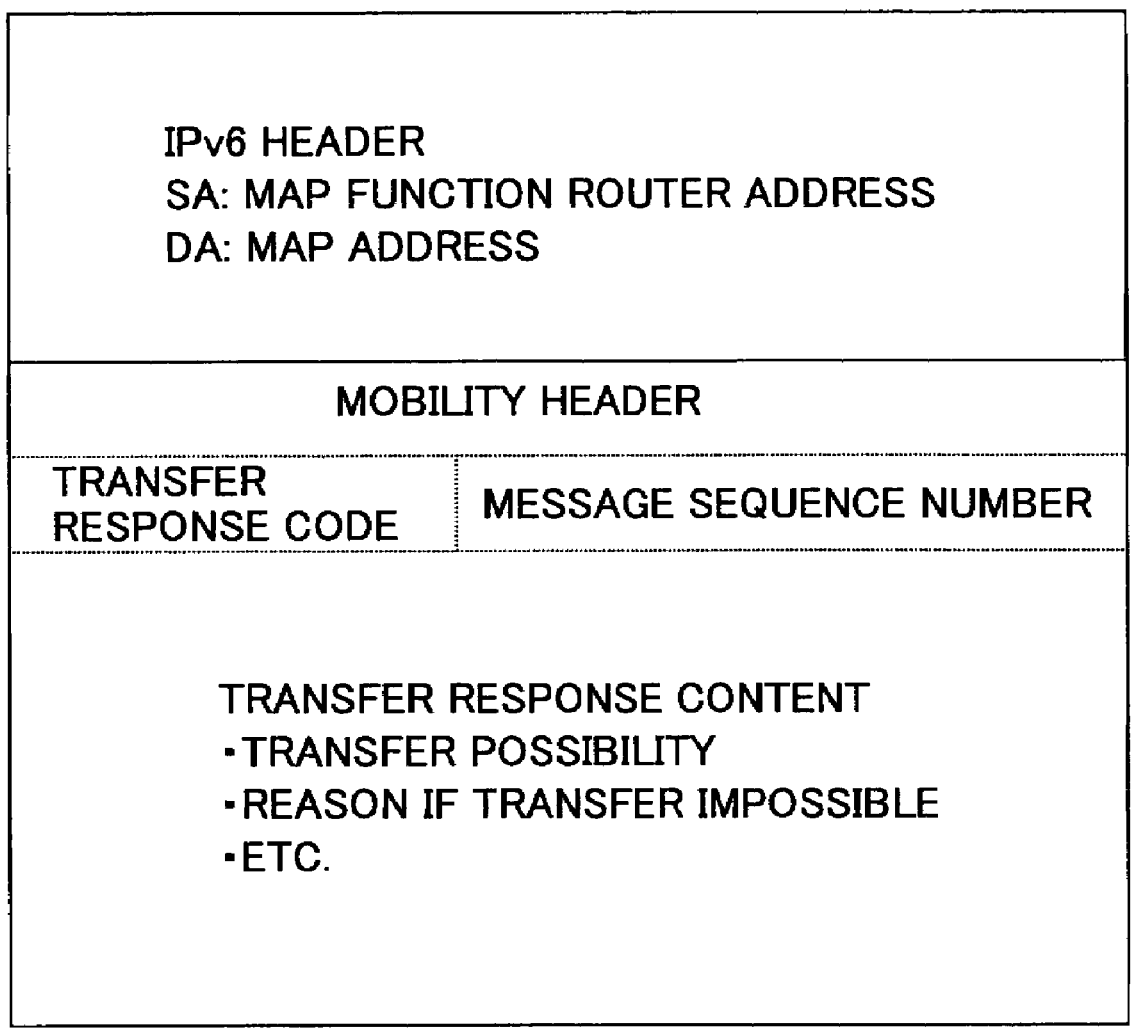
FIG. 25 is a drawing showing a format of a location information transfer response message.

FIG. 23 shows a message sequence when transferring a binding cache entry. First, a location information transfer request message having a format shown in FIG. 24 is transmitted from the MAP 60 to the MAP function router 60'. Then, a location information transfer response message having a format shown in FIG. 25 is returned from the MAP function router 60'.

Figure 26:
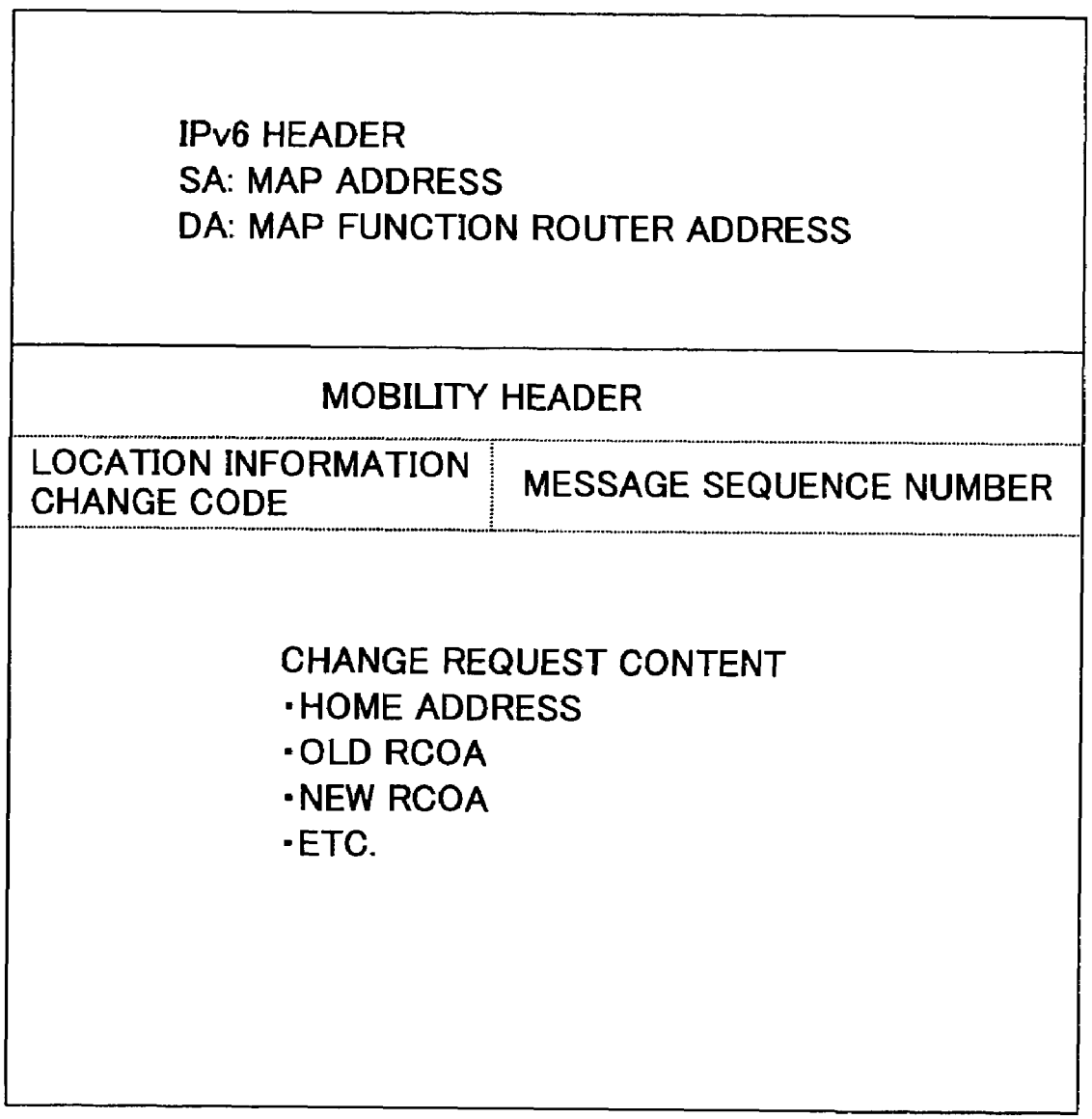
FIG. 26 is a drawing showing a format of a location information change request message.

Thus, the MAP 60 transmits a location information change request message having a format shown in FIG. 26 to a mobile node (MN). In changing the MAP 60, the RCoA of the mobile node is to be changed to an address that can be used by the new MAP 60 (MAP function router 60'). When the RCoA is changed, the mobile node (MN) reports (location registration) the changed RCoA to a home agent (HA), and also reports (location registration) the changed RCoA to a correspondent node (CN) when route optimization is performed with respect to the correspondent node (CN). This message may use a binding update message of an existent mobile IP.

Figure 27:
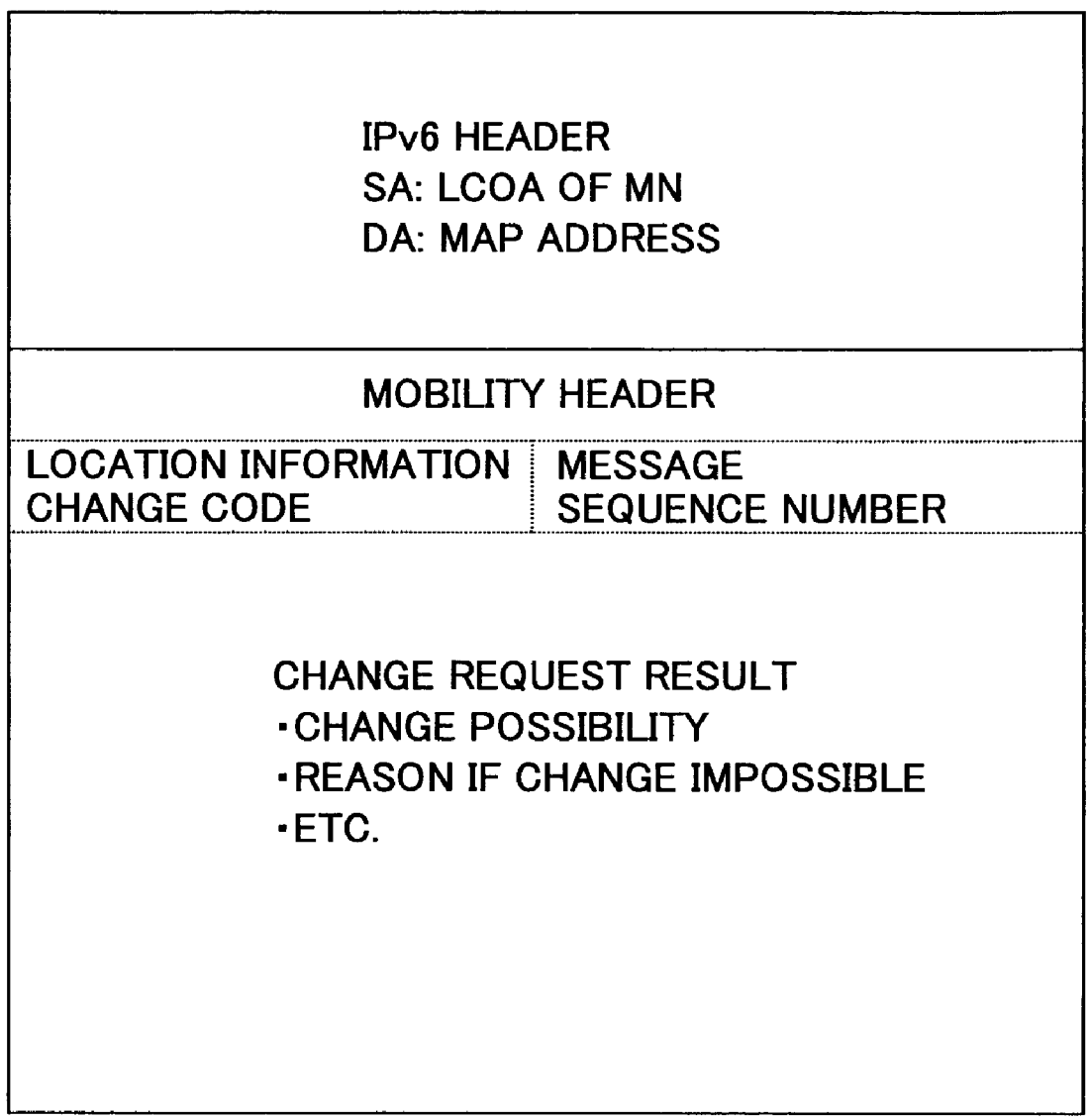
FIG. 27 is a drawing showing a format of a location information change response message.

The mobile node obtains the location information change request message and transmits a location information change response message having a format shown in FIG. 27 to the MAP 60. Accordingly, the corresponding entry is deleted from the binding cache table 65 in the MAP 60. Thereby, the load of the MAP 60 can be decentralized to the MAP function router 60'.

In the exemplary messages shown in FIGS. 24 to 27, the messages are defined by mobility headers subsequent to the IPv6 header, in which a code showing the type of message and a sequence number of each message are applied thereto.

Accordingly, the present invention provides a load decentralization method for decentralizing load centralized to a MAP of a hierarchical domain in a network where packets destined to mobile nodes in the network are transmitted to the mobile nodes via the MAP, the MAP including a table part for managing a corresponding relation of home addresses and Care-of-Addresses of the mobile nodes in the hierarchical domain, the method including the steps of providing a same function as the MAP to at least a portion of routers situated in the hierarchical domain of the MAP, moving one of the elements in the table part to the portion of the routers when a congestion of the MAP is detected, and actuating the portion of the routers to operate as a substitute of the MAP. Thus, load can be decentralized by activating the router (MAP function router) as the MAP in a case where the MAP is congested.

Furthermore, the present invention provides a MAP apparatus of a hierarchical domain in a network where packets destined to mobile nodes in the network are transmitted to the mobile nodes via the MAP apparatus, the MAP apparatus including a table part for managing a corresponding relation of home addresses and Care-of-Addresses of the mobile nodes in the hierarchical domain, a MAP load state detection part for detecting a load state of the MAP apparatus, and an element moving part for moving one of the elements in the table part to at least a portion of routers situated in the hierarchical domain of the MAP apparatus when a congestion of the MAP apparatus is detected and actuating the portion of the routers to operate as a substitute for the MAP apparatus, wherein the portion of the routers is provided with a same function as the MAP apparatus. Thus, load can be decentralized by moving a portion of the load of the MAP apparatus to the router (MAP function router) situated in the hierarchical domain in a case where the MAP apparatus is congested.

Furthermore, in the MAP apparatus according to an embodiment of the present invention, the MAP apparatus may further include a router load state detection part for detecting a load state of each of the routers situated in the hierarchical domain and selecting a router for receiving the element according to the detected load state, wherein the selected router is a router having a small load. Thus, load can be decentralized by moving a portion of the load of the MAP apparatus to the router having a small load in a case where the MAP apparatus is congested.

Furthermore, in the MAP apparatus according to an embodiment of the present invention, the MAP apparatus may further include an element selection part for selecting the element to be moved from the table part, wherein the selected element is an element that is referred for the largest number of times among the elements in the table part. Thus, load can be decentralized by moving a large load of the MAP apparatus to the router (MAP function router).

Furthermore, the present invention provides a MAP function router of a hierarchical domain in a network where packets destined to mobile nodes in the network are transmitted to the mobile nodes via a MAP through each router in the hierarchical domain, the MAP including a table part for managing a corresponding relation of home addresses and Care-of-Addresses of the mobile nodes in the hierarchical domain, the MAP function router including a MAP function part having a same function as the MAP. Thus, the router (MAP function router) can receive an element moved from the table part in the MAP.

It is to be noted that the apparatus of the present invention may be applied to a HA in a hierarchical mobile Ipv6 by replacing the correspondence table indicative of RCoAs and LCoAs provided in the MAP with a correspondence table indicative of home addresses and RCoAs provided in a home agent. In addition, by replacing with the correspondence table indicative of home addresses and RCoAs provided in the home agent, the apparatus of the present invention may be applied to a HA in a mobile Ipv6 (see IETF DRAFT draft-ietf-mobileip-ipv6-19.txt).

It is to be noted that, although the above-described embodiment mainly describes executing load decentralization in a case where a MAP is congested by activating a MAP function router within a hierarchic domain of the MAP to operate as a MAP, the load decentralization may also be executed with a MAP function router that is already operating as the MAP in a case where the MAP is congested.

It is to be noted that the table part read in the claim includes the binding cache table 65, the MAP load state detection part read in the claim includes the load state determination part 70, the table element moving part includes the load decentralization message process part 81, the MAP function router information acquisition timer 82, and the MAP function router list 85, and the element selection part read in the claim includes the location information referring part 145 and the decentralization data selection part 84.

Further, the present invention is not limited to these embodiments, but various variations and modifications may be made without departing from the scope of the present invention.

What is claimed is:

1. A load decentralization method for decentralizing load centralized to a Mobility Anchor Point (MAP) of a hierarchical domain in a network where packets destined to mobile nodes in the network are transmitted to the mobile nodes via the MAP, the MAP including a table part including a plurality of elements for managing a corresponding relation of home addresses and Care-of-Addresses of the mobile nodes in the hierarchical domain, the method comprising the steps of:

providing a same function as the MAP to at least a portion of routers situated in the hierarchical domain of the MAP;

referring to one of the plural elements included in the table part;

moving the one of the plural elements in the table part to the portion of the routers based on the number of times the one of the plural elements is referenced when a congestion of the MAP is detected; and actuating the portion of the routers to operate as a substitute of the MAP.

2. A Mobility Anchor Point (MAP) apparatus of a hierarchical domain in a network where packets destined to mobile nodes in the network are transmitted to the mobile nodes via the MAP apparatus, the MAP apparatus comprising:

a computer processor including
a table part including a plurality of elements to manage a corresponding relation of home addresses and Care-of-Addresses of the mobile nodes in the hierarchical domain, wherein the table part includes a binding cache table;
a location information referring part to refer to one of the plural elements included in the table part;
a MAP load state detection part to detect a load state of the MAP apparatus; and
an element moving part to move the one of the plural elements in the table part to at least a portion of routers situated in the hierarchical domain of the MAP apparatus based on the number of times the one of the plural elements is referenced when a congestion of the MAP apparatus is detected and actuating the portion of the routers to operate as a substitute for the MAP apparatus, wherein the portion of the routers is provided with a same function as the MAP apparatus.

3. The MAP apparatus as claimed in claim 2, further comprising a router load state detection part to detect a load state of each of the routers situated in the hierarchical domain and to select a router for receiving the element according to the detected load state, wherein the selected router is a router having a small load.

4. The MAP apparatus as claimed in claim 2, further comprising an element selection part to select the element to be moved from the table part, wherein the selected element is an element that is referenced as the largest number of times among the elements in the table part.

5. The MAP apparatus as claimed in claim 4, wherein the number of times of reference is stored in the table part in correspondence with each element.

6. A Mobility Anchor Point (MAP) function router of a hierarchical domain in a network where packets destined to mobile nodes in the network are transmitted to the mobile nodes via a MAP through each router in the hierarchical domain, the MAP including a table part including a plurality of elements for managing a corresponding relation of home addresses and Care-of-Addresses of the mobile nodes in the hierarchical domain, the MAP function router comprising:

a computer processor including
a MAP function part having a same function as the MAP and receiving one of the plural elements in the table part based on the number of times the one of the plural elements is referenced when a congestion of the MAP is detected;
wherein the table part includes a binding cache table.

7. The MAP function router as claimed in claim 6, wherein the MAP function part includes a MAP function router table part to store an element moved from the table part of the MAP and is operable as a substitute for the MAP.

* * * * *